United States Patent [19]
Miichi et al.

[11] Patent Number: 5,557,525
[45] Date of Patent: Sep. 17, 1996

[54] WHEEL ALIGNMENT CONTROL METHOD FOR A MOTOR VEHICLE AND A CONTROL APPARATUS THEREOF

[75] Inventors: Yoshiki Miichi; Tadao Tanaka; Mitsuhiko Harara, all of Okazaki, Japan

[73] Assignee: Mitsubishi Jidosha Kogyo Kabushiki Kaisha, Tokyo, Japan

[21] Appl. No.: 535,319

[22] Filed: Sep. 27, 1995

Related U.S. Application Data

[63] Continuation of Ser. No. 134,896, Oct. 13, 1993, abandoned.

[30] Foreign Application Priority Data

Oct. 13, 1992 [JP] Japan .................................. 4-274234
Oct. 13, 1992 [JP] Japan .................................. 4-274235
Oct. 13, 1992 [JP] Japan .................................. 4-274236

[51] Int. Cl.⁶ ............................................. B60G 17/00
[52] U.S. Cl. ...................... 364/424.05; 395/905; 280/707
[58] Field of Search .......................... 364/424.01–424.05, 364/436, 437, 438; 395/900, 905, 913; 280/707, 840

[56] References Cited

U.S. PATENT DOCUMENTS

| | | | |
|---|---|---|---|
| 4,371,191 | 2/1983 | Goldberg et al. | 280/707 |
| 4,714,270 | 12/1987 | Rumpel | 280/690 |
| 4,835,714 | 5/1989 | Sano et al. | 364/551.01 |
| 4,836,577 | 6/1989 | Abe et al. | 280/773 |
| 4,862,854 | 9/1989 | Oda et al. | 123/399 |
| 5,060,157 | 10/1991 | Tado et al. | 364/424.05 |
| 5,159,555 | 10/1992 | Wada | 364/424.05 |
| 5,189,621 | 2/1993 | Onari et al. | 364/431.04 |
| 5,446,660 | 8/1995 | Miichi et al. | 364/424.05 |

FOREIGN PATENT DOCUMENTS

| | | |
|---|---|---|
| 59-67111 | 4/1984 | Japan . |
| 60-193781 | 10/1985 | Japan . |
| 62-55205 | 3/1987 | Japan . |
| 532114 | 2/1993 | Japan . |

*Primary Examiner*—Michael Zanelli
*Attorney, Agent, or Firm*—Birch, Stewart, Kolasch & Birch, LLP

[57] ABSTRACT

A wheel alignment control method for a motor vehicle and a control apparatus therefor in which every time a vehicle drive state, steering history, and high-speed steering-hold mode are discriminated by sensor outputs, a processor determines target values of a caster angle, camber angle, and toe angle in accordance with inference outputs computed by fuzzy inference based on fuzzy rules, corresponding individually to a plurality of vehicle drive modes, steering modes, and high-speed steering-hold mode, and discrimination results. Operating sections adjust the camber and the like by means of a driver circuit which responds to the processor outputs. Thus, a fine adjustment for alignment is made, and wheel alignment adaptable to the vehicle drive modes and the like is established.

28 Claims, 14 Drawing Sheets

FIG. 22
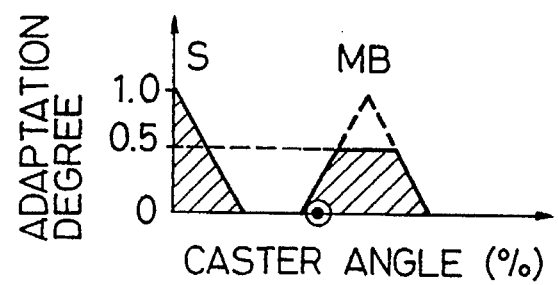
FIG. 23
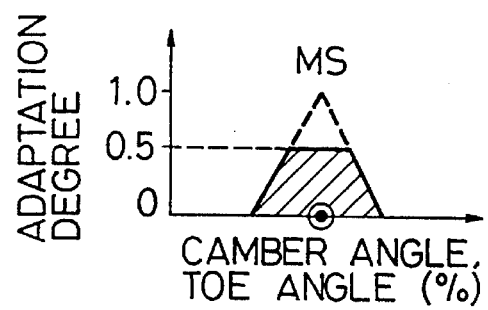
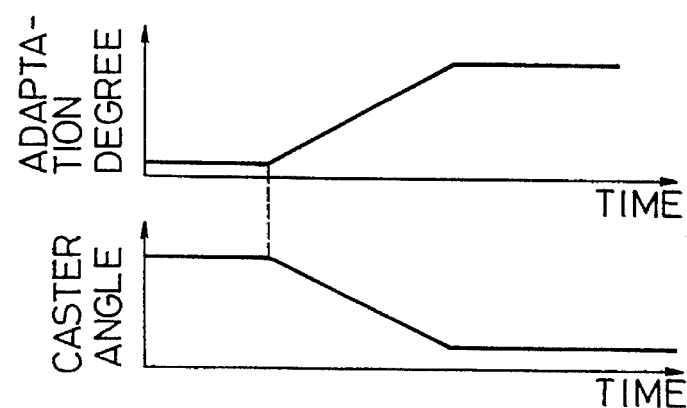
FIG.24(a)
FIG.24(b)

WHEEL ALIGNMENT CONTROL METHOD FOR A MOTOR VEHICLE AND A CONTROL APPARATUS THEREOF

This application is a continuation of application Ser. No. 08/134,896 filed on Oct. 13, 1993, now abandoned.

BACKGROUND OF THE INVENTION

The present invention relates to a wheel alignment control method for a motor vehicle and a control apparatus therefor, and more particularly, to a control method and a control apparatus for establishing wheel alignment adaptable to a vehicle drive state by making a fine adjustment for wheel alignment.

A motor vehicle may be put in various situations, such as a state in which it is driven at a very low speed, a state in which it runs in an urban district or on a thruway or mountain road, etc. In other words, there are various vehicle drive modes. With respect to steering operation, moreover, there are various steering modes associated with the frequency of the steering operation, troublesomeness of the steering operation a driver feels, and the like. Thus, the vehicle drive state (vehicle drive mode and steering mode) variously changes, and optimum wheel alignment varies depending on the vehicle drive state.

In order to achieve the wheel alignment properly, as is conventionally known, it is automatically adjusted in accordance with the behavior of the vehicle detected during the vehicle drive or the vehicle drive state. Proposed in Japanese Patent Provisional Publication No. 5-32114, for example, is a control method in which camber angle adjusting means attached individually to front and rear wheels of a vehicle are independently controlled in accordance with the transverse acceleration of the vehicle, which is indicative of the vehicle behavior, whereby the camber angle and, therefore, wheel alignment can be controlled. Proposed in Japanese Patent Provisional Publication No. 60-193781, moreover, is a method in which a vehicle velocity indicative of the vehicle behavior is detected, and the camber angle is changed to the negative side when the vehicle velocity exceeds a predetermined level. Described in Japanese Patent Provisional Publications Nos. 59-67111 and 62-55205, furthermore, are a method in which the caster angle is increased in a high-velocity region, and a method in which the toe angle is controlled so as to be adaptable to the vehicle velocity, respectively.

According to the prior art methods described above, the camber angle, caster angle, or toe angle, and therefore, the wheel alignment is variably adjusted in accordance with the vehicle transverse acceleration or change of vehicle velocity, which is indicative of the vehicle behavior. Accordingly, the wheel alignment can be adjusted in some measure to the vehicle drive state as well as the vehicle behavior.

Since the vehicle drive state changes variously, however, it is generally difficult to establish optimum wheel alignment for the drive state at all times. According to some of the individual prior art methods described above or combinations thereof in which the vehicle drive state is discriminated by the transverse acceleration or vehicle velocity, for example, the vehicle drive state, which changes variously as aforesaid, cannot be detected properly, so that it is hard to establish the optimum wheel alignment.

SUMMARY OF THE INVENTION

The object of the present invention is to provide a wheel alignment control method for a vehicle and a control apparatus therefor, in which a vehicle drive state can be properly detected so that a proper adjustment can be made for alignment, whereby optimum wheel alignment can be established.

According to an aspect of the present invention, a wheel alignment control method for a vehicle is provided, which comprises the steps of: previously defining a plurality of vehicle conditions; previously setting control rules corresponding individually to the plurality of vehicle conditions; detecting values of a plurality of parameters indicative of a behavior of the vehicle; selecting a corresponding one or ones of the control rules in accordance with the detected values of the plurality of parameters; fetching a control output in accordance with the selected control rule or rules and the detected values of the plurality of parameters; and determining a target value of a wheel alignment control parameter in accordance with the retrieved control output.

Preferably, the control rules are fuzzy rules including the plurality of parameters as fuzzy variables, and the control output is an inference output fetched by fuzzy inference according to the fuzzy rules. More preferably, the fuzzy rules include the plurality of parameters as antecedent variables and the wheel alignment control parameter as a consequent variable. Further, each fuzzy rule is set by using membership functions indicative of fuzzy sets associated individually with corresponding ones of the antecedent and consequent variables.

Preferably, the plurality of vehicle conditions include at least two modes including one or more vehicle drive modes and one or more steering modes. More preferably, the one or more vehicle drive modes include at least one of a very-low-speed drive mode, urban district drive mode, suburb drive mode, mountain road drive mode, thruway drive mode, and high-speed steering-hold mode each of which is represented by a fuzzy set or a combination of fuzzy sets associated with one or more corresponding fuzzy variables. Each of the one or more steering modes is set in accordance with either one or both of degrees of fatigue and perceived difficulty a driver feels during steering operation. Further, each of the degrees of fatigue and perceived difficulty the driver feels is represented by a fuzzy set or a combination of fuzzy sets associated with one or more corresponding fuzzy variables.

Preferably, the plurality of parameters include at least two of a vehicle velocity, vehicle transverse acceleration, vehicle longitudinal acceleration, steering angle, steering angular speed, first steering history, and second steering history. More preferably, the first steering history is a frequency of steering covering a predetermined steering angle or wider angle within a given time. Further, the second steering history is a frequency of steering covering a predetermined steering angular speed or higher speed within a given time.

Preferably, the wheel alignment control parameter includes at least one of a camber angle, caster angle, and toe angle of wheels.

According to another aspect of the present invention, a wheel alignment control apparatus for a vehicle is provided, which comprises: sensor means for detecting values of a plurality of parameters indicative of a behavior of the vehicle; actuators respectively provided in suspensions of the vehicle for changing a wheel alignment characteristic of the vehicle; drive means for driving the actuators; and a controller for supplying a control signal to the drive means. The controller is operable to store a predetermined plurality of vehicle conditions, previously control rules corresponding individually to the plurality of vehicle conditions, select a corresponding one or ones of the control rules in accordance with the values of the plurality of parameters detected by the sensor means, retrieve a control output in accordance with the selected control rule or rules and the detected values of the plurality of parameters, and determine a target value of a wheel alignment control parameter in accordance with the retrieved control output.

Advantages of the present invention lie in that actual vehicle conditions, which can vary every moment, are properly detected by detecting the values of the plurality of parameters which are indicative of the behavior of the vehicle, and that alignment control can be executed compositely, so as to be reflective of various causes of fluctuations of the vehicle conditions, by determining the target value of the wheel alignment control parameter in accordance with one or ones of the control rules, predeterminedly corresponding individually to the vehicle conditions predetermined earlier, which correspond(s) to the detected parameter values. Thus, even though the vehicle conditions change variously, an adjustment for alignment can be made in conformity with the changes of the vehicle conditions, so that optimum wheel alignment can be established at all times.

According to a preferred embodiment of the present invention in which the fuzzy rules, including the parameters as the fuzzy variables, are used as the control rules, fine alignment control can be executed without requiring complicated weighting control. Thus, in comparison with the case where the weighting control is required, information processing time for the alignment control can be shortened, so that various control operations including the alignment control can be executed on a real-time basis with a lower possibility of hindrance. Since the complicated weighting control is unnecessary, moreover, requirements for the performance of an information processor are relaxed, so that the equipment cost for the alignment control can be reduced.

According to another preferred embodiment of the present invention in which at least two of the modes including the one or more vehicle drive modes and the one or more steering modes are defined as the vehicle conditions, wheel alignment adaptable to the vehicle drive mode can be established without regard to the current vehicle drive mode, whether the very-low-speed drive mode, urban district drive mode, suburb drive mode, mountain road drive mode, thruway drive mode, or high-speed steering-hold mode. Moreover, wheel alignment adaptable to the steering history can be established by setting the steering modes in accordance with the steering history, e.g., the degree of fatigue or perceived difficulty the driver feels during the steering operation. In the case where the steering frequency is increased so that the driver is liable to feel tired, for example, the adjustment for the wheel alignment can be made to relieve the work load on the driver in the steering operation. In the high-speed steering-hold mode which gradually causes the driver to feel a heavy burden from the steering operation, e.g., when the vehicle rounds a long curve on a thruway, wheel alignment capable of reducing the steering force (necessary force for steering wheel operation) can be achieved.

According to still another preferred embodiment of the present invention in which at least two of the parameters including the vehicle velocity, vehicle transverse acceleration, vehicle longitudinal acceleration, steering angle, steering angular speed, first steering history, and second steering history are detected, the vehicle conditions can be properly detected without regard to the conditions including the vehicle drive mode and steering mode, so that optimum wheel alignment for the vehicle conditions can be established.

According to a further preferred embodiment of the present invention in which at least one of the angles including the camber angle, caster angle, and toe angle of the wheels is used as the alignment control parameter, composite alignment control can be effected such that the camber angle, caster angle, and toe angle are simultaneously controlled as required, for example.

BRIEF DESCRIPTION OF THE DRAWINGS

FIG. 22 is a graph illustrating a second inference output associated with the caster angle and a target caster angle value obtained by making the second inference output non-fuzzy, these values being obtained during the execution of the control program of FIG. 20;

FIG. 23 is a graph illustrating second inference outputs associated with the camber angle and toe angle and a target camber angle value; and FIGS. 24(a) and 24(b) are diagrams for illustrating adjustment for wheel alignment at the start of a high-speed steering-hold mode, in which FIG. 24(a) shows an increase of the degree of adaptation of an actual steering state to a first fuzzy rule with the passage of time, and FIG. 24(b) shows a decrease of the caster angle with the passage of time.

DETAILED DESCRIPTION OF THE INVENTION

Figure 1:
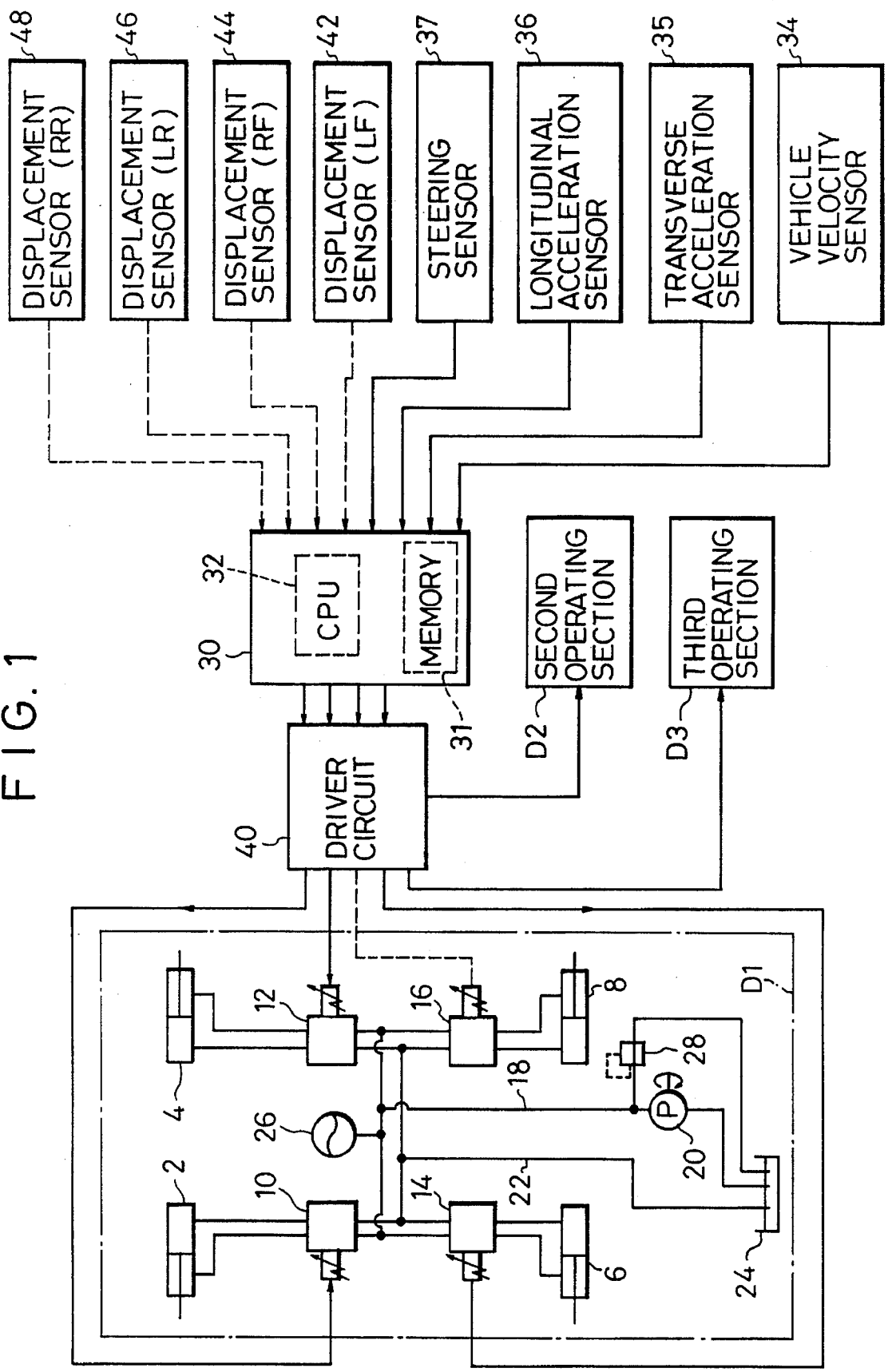
FIG. 1 is a diagram showing the principal part of a control system for carrying out a wheel alignment control method according to the present invention.

The following is a description of a control system for carrying out a wheel alignment control method for a motor vehicle according to a first embodiment of the present invention.

This control system is designed so that the degree of adaptation of an actual steering history to each of preset steering modes and the degree of adaptation of an actual vehicle drive state to each of preset vehicle drive modes are obtained by fuzzy inference, inference outputs reflective of the adaptation degrees are further obtained, and wheel alignment control parameters (hereinafter referred to as alignment parameters) are adjusted to target values determined in accordance with the inference outputs, whereby wheel alignment can be effected properly.

In the present embodiment, the steering history is discriminated on the basis of the frequency of steering operation (hereinafter referred to as first steering frequency) Nha covering a predetermined steering angle or wider angle within a given time and the frequency of steering operation (hereinafter referred to as second steering frequency) Ndha covering a predetermined steering angular speed or higher speed within a given time, for use as fuzzy variables. Also, the vehicle drive state is discriminated on the basis of the vehicle velocity V and the respective absolute values |Yg|, |Xg|, |Ha| and |DHa| (symbol D designates a differential operator) of the transverse acceleration, longitudinal acceleration, steering-wheel angle, and steering-wheel angular speed, for use as fuzzy variables. Prearranged, moreover, are a plurality of steering modes including a first steering mode in which the steering operation causes a driver to feel a high degree of fatigue, a second steering mode in which the steering operation causes a medium degree of fatigue, a third steering mode in which the steering operation causes a low degree of fatigue, a fourth steering mode in which the steering operation causes the driver to feel a high degree of perceived difficulty, a fifth steering mode in which the steering operation causes a medium degree of perceived difficulty, and a sixth steering mode in which the steering operation causes a low degree of perceived difficulty. Prearranged, furthermore, are a plurality of vehicle drive modes including a very-low-speed drive mode for a crawl, vehicle garaging, etc., a first urban district drive mode for drives at intersections, in heavy-traffic urban districts, etc., a second urban district drive mode for drives in light-traffic urban districts, a suburb drive mode for drives in light-traffic suburbs, a first mountain road drive mode for drives on mountain roads which require frequent steering operations, a second mountain road drive mode for drives on mountain roads including high-speed curves which require less frequent steering operations, and a thruway drive mode. Each of the steering modes and the drive modes is represented by a fuzzy set or a combination of fuzzy sets associated with one or more corresponding fuzzy variables, out of the aforesaid fuzzy variables. A camber angle, caster angle, and toe angle (hereinafter referred to simply as camber, caster, and toe), as front wheel alignment parameters, and a camber as a rear wheel alignment parameter are variably adjusted.

As shown in FIG. 1, the control system comprises a controller 30 which includes a memory 31 and a processor (CPU) 32 for executing a control program. The memory 31 is composed of a read-only memory (ROM) loaded with a wheel alignment control program, fuzzy rules, etc. and a random access memory (RAM) for temporary storage of data. The processor 32 is connected to a vehicle velocity sensor 34, a transverse acceleration sensor 35, a longitudinal acceleration sensor 36, and a steering sensor 37 through input and output circuits (not shown). Thus, the processor 32 receives the vehicle velocity, transverse acceleration, longitudinal acceleration, and steering-wheel angle, as inputs. Based on steering-wheel angles inputted one after another, the processor 32 computes the steering-wheel angular speed and discriminates the direction of vehicle revolution. Based on the input steering-wheel angles and the computed steering-wheel angular speed, moreover, the processor 32 computes the first and second steering frequencies Nha and Ndha in the manner mentioned later. The control system further comprises a driver circuit 40, which responds to control outputs from the processor 32, and first, second, and third operating sections D1, D2 and D3 which are driven by means of the circuit 40.

Figure 2:
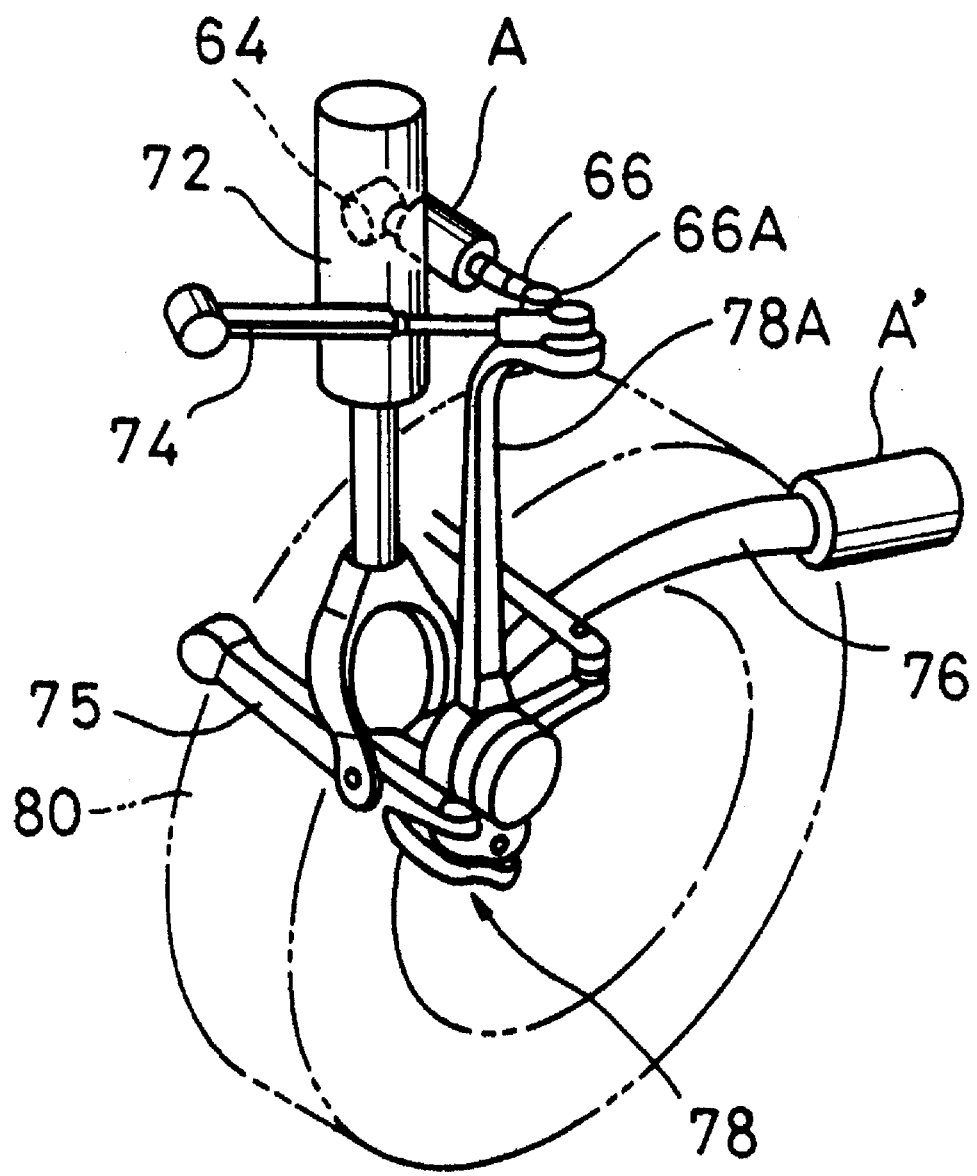
FIG. 2 is a perspective view showing the way actuators shown in FIG. 1 are incorporated in a suspension.

The first operating section D1 includes first variable-arm-length actuators 2, 4, 6 and 8 (designated by symbol A without discrimination in FIG. 2) for camber adjustment, which are attached individually to four wheel suspensions. The construction of the actuators will be described in detail later. As shown in FIG. 2, each actuator A is interposed, as one of the upper arms, between the vehicle body (not shown) and a hub carrier 78 on which a wheel 80 is mounted. Thus, the camber of the corresponding wheel can be adjusted as an arm (mentioned later) of the actuator extends and contracts in the crosswise direction of the vehicle. In FIG. 2, reference numeral 72 denotes a strut; 74, an upper arm; 75 and 76, lower arms; and 78A, a link of the hub carrier.

Referring to FIG. 1, the first operating section D1 further includes solenoid-operated control valves 10, 12, 14 and 16 which drive the actuators 2, 4, 6 and 8, respectively, in response to driving outputs from the driver circuit 40. The control valves 10 to 16 are connected to a pump 20 by means of a supply line 18, and to an oil reservoir 24 by means of a discharge line 22. The pump 20, which is driven by means of an engine (not shown) or the like, sucks oil from the oil reservoir 24 and discharges it to the discharge line 18. An accumulator 26 is connected to the supply line 18, and also, the reservoir 24 is connected to the line 18 through a relief valve 28, whereby the oil pressure In the line 18 can be kept constant. Each of the control valves 10 to 16 takes any one of three operating positions, first, second, and third. In the first operating position, each control valve prohibits oil from being supplied to or discharged from its corresponding one of the first actuators 2 to 8, thereby preventing the arm of the actuator from extending or contracting. In the second operating position, the oil is supplied or discharged so as to extend the arm. In the third operating position, the oil is supplied or discharged so as to contract the arm.

The second operating section D2 includes two control valves (not shown) and two second variable-arm-length actuators (designated by symbol A' in FIG. 2) corresponding to these control valves. The control valves are constructed in the same manner as the control valves 10 to 16 of the first operating section D1, and are connected to the oil supply and discharge system of the operating section D1 including the elements 18 to 28. They control the oil supply to and discharge from the second actuators A' in accordance with the driving outputs from the driver circuit 40. The second actuators A' are constructed in the same manner as the first actuators A, and are provided individually for the two suspensions on the front-wheel side. Each actuator A' is interposed between the lower arm 76 and the vehicle body so that the arm extends or contracts in the lengthwise direction of the vehicle body, thereby adjusting the caster of the corresponding wheel.

The third operating section D3 includes two control valves (not shown), constructed in the same manner as those of the first and second operating section D1 and D2, and two third variable-arm-length actuators (not shown) corresponding individually to the control valves and having the same construction as the first and second actuators A and A'. The oil supply to and discharge from the third actuators through the oil supply and discharge system elements 18 to 28 are controlled by means of the control valves which respond to the driving outputs from the driver circuit 40. The third actuators are provided individually for the two suspensions on the front-wheel side, and each third actuator is interposed between, for example, the lower arm 75 and the vehicle body so that the arm extends or contracts in the crosswise direction of the vehicle body, thereby adjusting the toe of the corresponding wheel.

In FIG. 1, reference numerals 42, 44, 46 and 48 individually denote displacement sensors for detecting the respective stroke positions of the four first actuators 2 to 8. These sensors, along with like displacement sensors (not shown) corresponding to the two second actuators and the two third actuators, are connected to the controller 30.

Figure 3:
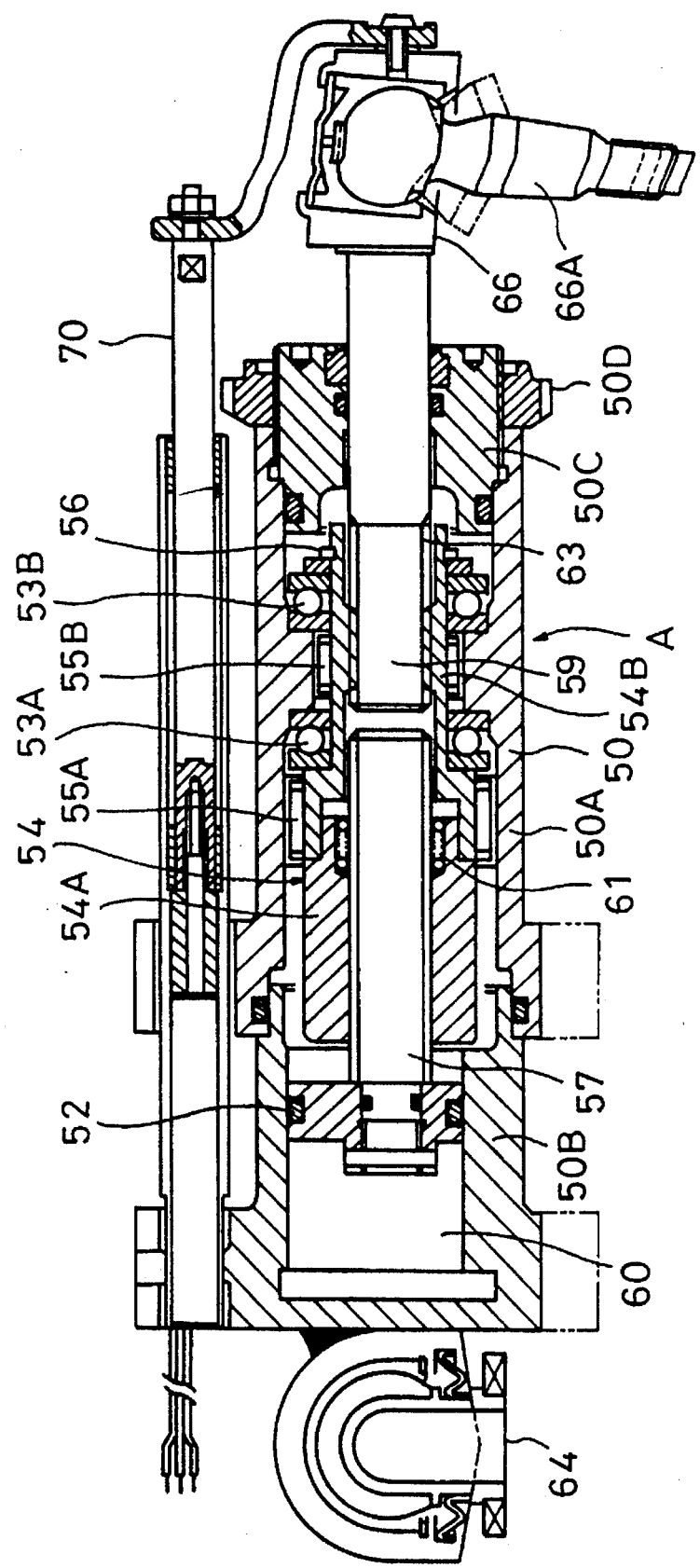
FIG. 3 is a detailed sectional view of the actuator shown in FIGS. 1 and 2.

Referring to FIG. 3, each first actuator A comprises a cylinder body 50, a piston 52 axially movable in the body 50, a piston rod 57 connected integrally to the piston 52, a cylindrical rotary member 54 rotatable in association with the rod 57, and a rod 59 axially movable in association with the member 54.

More specifically, the cylinder body 50 is composed of a piston holding portion 50B containing the piston 52, a rotary member supporting portion 50A fixed to the holding portion 50B, and end members 50C and 50D fixed to an end portion of the supporting portion 50A. The rotary member 54 is supported for rotation inside the rotary member supporting portion 50A by means of thrust bearings 53A and 53B and rotary bearings 55A and 55B so that it is immovable in the axial direction. Two portions 54A and 54B of the rotary member 54 are connected to each other for integral rotation. A mounting portion 64 at the outer end of the piston holding portion 50B is attached to, for example, the vehicle body by means of a bush or the like. The piston 52 is located in the piston holding portion 50B of the cylinder body 50 so that an oil chamber 60 is defined between the piston 52 and the inner wall of the holding portion 50B. The outer periphery of the piston 52 and the inner periphery of the oil chamber 60 have an elliptic shape such that the piston 52 is nonrotatable in the chamber 60. A ball screw 61 is interposed between the piston rod 57, which is connected to the piston 52, and the rotary member 54. The screw 61 is used to convert an axial movement of the piston rod 57 relative to the cylinder body 50 into a rotatory motion of the rotary member 54. Also, a trapezoidal screw 63 is interposed between the rotary member 54 and the rod 59 so that the rod 59 is nonrotatable. The screw 63 is used to convert the rotatory motion of the rotary member 54 into an axial movement of the rod 59.

The trapezoidal screw 63 converts the rotatory motion into the axial movement, but prevents conversion from the axial movement into the rotatory motion so that the rod 59 cannot move in the axial direction unless the rotary member 54 rotates. The rod 59 extends through the end member 50C to the outside of the cylinder body 50, and is attached to the hub carrier by means of a rod 66A, which is pivotally mounted on a mounting portion 66 on the outer end of the rod 59. A stroke sensor 70 (corresponding to the displacement sensor 42, 44, 46 or 48 of FIG. 1) for detecting the arm length is provided between the piston holding portion 50B of the cylinder body 50 and the mounting portion 66 on the rod 59.

When the oil is fed into the oil chamber 60, in each of the first actuators 2 to 8 constructed in this manner, the piston 52 and the piston rod 57 move to the right of FIG. 3. Thereupon, the axial movement of the rod 57 is converted into a rotatory motion of the rotary member 54 by means of the ball screw 61, and the rotatory motion of the member 54 is converted into an axial movement of the rod 59 by means of the trapezoidal screw 63. As a result, the rod 59 moves away from the cylinder body 50, so that the distance between the mounting portions 64 and 66, that is, the arm length, increases. When the oil is discharged from the oil chamber 60, in contrast with this, the rod 59 moves toward the cylinder body 50, so that the distance between the mounting portions 64 and 66, that is, the arm length, is reduced.

The second and third actuators have the same construction and operate in the same manner as the first actuators 2 to 8. Therefore, a detailed description of the construction and functions of the second and third actuators will be omitted.

In connection with the fuzzy inference function of the control system, the ROM of the memory 31 of the controller 30 is loaded with thirteen fuzzy rules described in IF-THEN form, as shown in Table 1 below.

TABLE 1

| | Antecedent | | | | | | | Consequent | | |
|---|---|---|---|---|---|---|---|---|---|---|
| | Nha | Ndha | V | \|Yg\| | \|Xg\| | \|Ha\| | \|DHa\| | θ1 | θ2, | θ3 |
| First steering (mode) | B | — | — | — | — | — | — | S | | B |
| Second steering (mode) | M | — | — | — | — | — | — | M | | M |
| Third steering (mode) | S | — | — | — | — | — | — | B | | S |
| Fourth steering (mode) | — | B | — | — | — | — | — | S | | B |
| Fifth steering (mode) | — | M | — | — | — | — | — | M | | M |
| Sixth steering (mode) | — | S | — | — | — | — | — | B | | S |
| Very-low-speed (drive mode) | — | — | S | — | — | — | — | S | | B |
| First urban district | — | — | MS | S | — | B | B | M S | | M B |
| Second urban district | — | — | MS | — | — | MB | M | M | | M |
| Suburb | — | — | MB | M | — | — | MB | M | | M |
| First mountain road | — | — | M | MB | MB | MB | M | M S | | M B |
| Second mountain road | — | — | MB | B | — | M | MS | M B | | M S |
| Thruway | — | — | B | MS | S | S | S | B | | S |

In Table 1, symbols Nha, Ndha, V, |Yg|, |Xg|, |Ha| and |DHa| represent the first steering frequency (covering the predetermined steering angle or wider angle), second steering frequency (covering the predetermined steering angular speed or higher speed), vehicle velocity, and the respective absolute values of the transverse acceleration, longitudinal acceleration, steering-wheel angle, and steering-wheel angular speed, respectively, as seven antecedent items of the fuzzy rules. Symbols θ1, θ2 and θ3 represent the caster, camber, and toe, respectively, as three consequent items of the fuzzy rules. Further, each of symbols S, MS, M, MB and B represents a label which is indicative of a fuzzy subset (hereinafter referred to simply as fuzzy set) in a universe of discourse (base set) for its corresponding one of the first steering frequency, second steering frequency, vehicle velocity, transverse acceleration, longitudinal acceleration, steering-wheel angle, and steering-wheel angular speed. Each fuzzy set is represented by a membership function, as mentioned later.

In Table 1, a first fuzzy rule, "If Nha=B, then θ1=S, θ2=B and θ3=B," which corresponds to the first steering mode in which the steering operation causes a high degree of fatigue, indicates that if the first steering frequency is high, corresponding to the fuzzy set B, then the caster θ1 is made small, corresponding to the fuzzy set S, and the camber θ2 and the toe θ3 are made great, corresponding to the fuzzy set B. Second and third fuzzy rules correspond to the second and third steering modes, respectively, which are associated with the degree of fatigue from the steering operation.

A fourth fuzzy rule, "If Ndha=B, then θ1=S, θ2=B and θ3=B," which corresponds to the fourth steering mode in which the degree of perceived difficulty of the steering operation is high, indicates that if the second steering frequency is high, then the caster θ1 is made small, and the camber θ2 and the toe θ3 are made great. Fifth and sixth fuzzy rules correspond to the fifth and sixth steering modes, respectively, which are associated with the perceived difficulty of the steering operation.

Further, a seventh fuzzy rule, "If V=S, then θ1=S, θ2=B and θ3=B," which corresponds to the very-low-speed drive mode, indicates that if the vehicle velocity V is low, then the caster θ1 is made small, and the camber θ2 and the toe θ3 are made great. A description of eighth to thirteenth fuzzy rules, which correspond to the first and second urban district drive modes, suburb drive mode, first and second mountain road drive modes, and thruway drive mode, respectively, will be omitted.

Base sets for the first two antecedent items of the fuzzy rules, that is, the first and second steering frequencies Nha and Ndha, are individually indicated within the range of 0 cycle to 100 cycles, for example. Base sets for the remaining five antecedent items of the fuzzy rules, that is, the vehicle velocity V and the absolute values |Yg|, |Xg|, |Ha| and |DHa| of the transverse acceleration, longitudinal acceleration, steering-wheel angle, and steering-wheel angular speed, are individually indicated within the range of 0% to 100%. The relationships between the percentage indications and actual values are established in the manner shown in Table 2 below. For example, the vehicle velocity V

TABLE 2

| | V | \|Yg\| | \|Xg\| | \|Ha\| | \|DHa\| |
|---|---|---|---|---|---|
| 0% | 0 km/h | 0 G | 0 G | 0 deg | 0 deg/S |
| 100% | 250 km/h | 1 G | 1 G | 450 deg | 300 deg/S | is regarded as 0% when it is at 0 km/h, and as 100% when at 250 km/h.

Figure 4:
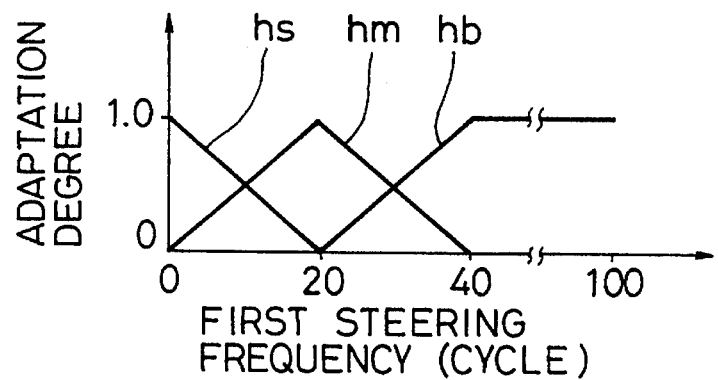
FIG. 4 is a graph showing membership functions associated with an antecedent item, a first steering frequency, of fuzzy rules used for fuzzy inference for carrying out a wheel alignment control method according to a first embodiment of the present invention.

For the base set associated with the first steering frequency Nha, moreover, membership functions hs, hm and hb for defining the three fuzzy sets S, M and B, respectively, are set in the manner shown in FIG. 4, and are stored in the ROM of the memory 31. Referring to FIG. 4, the membership function hs for defining the fuzzy set S is set so that its membership value or adaptation degree decreases from 1.0 to 0 as the first steering frequency Nha increases from 0 cycle to 20 cycles, and the membership function hm for defining the fuzzy set M is set so that its adaptation degree increases from 0 to 1.0 as the first steering frequency Nha increases from 0 cycle to 20 cycles, and decreases from 1.0 to 0 as the first steering frequency increases from 20 cycles to 40 cycles. Further, the membership function hb for defining the fuzzy set B is set so that its adaptation degree increases from 0 to 1.0 as the first steering frequency increases from 20 cycles to 40 cycles, and is at 1.0 as the first steering frequency ranges from 40 cycles to 100 cycles.

Figure 5:
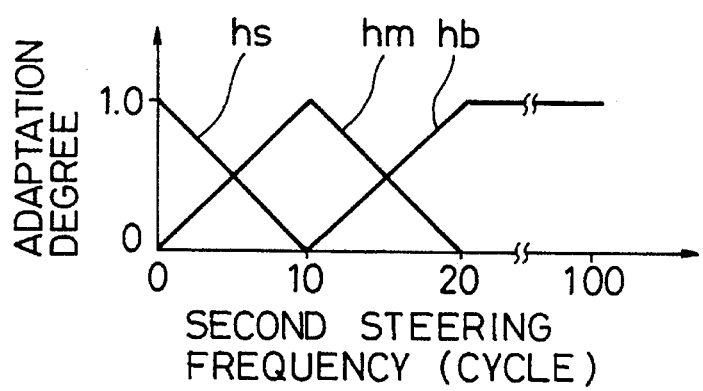
FIG. 5 is a graph showing membership functions associated with an antecedent item, a second steering frequency, of the fuzzy rules.

For the base set associated with the second steering frequency Ndha (which will not be described in detail), the membership functions hs, hm and hb for defining the three fuzzy sets S, M and B are set in the same manner as in the case of the first steering frequency Nha, as shown in FIG. 5, and are stored in the ROM.

Figure 6:
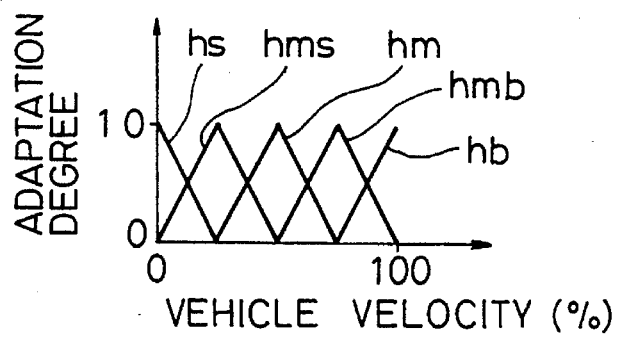
FIG. 6 is a graph showing membership functions associated with an antecedent item, a vehicle velocity, of the fuzzy rules.

For the base set associated with the vehicle velocity V, furthermore, membership functions hs, hms, hm, hmb and hb for defining the five fuzzy sets S, MS, M, MB and B, respectively, are set in the manner shown in FIG. 6, and are stored in the ROM. For each of the base sets (not shown)

associated with the transverse acceleration Yg, longitudinal acceleration Xg, steering-wheel angle Ha, and steering-wheel angular speed DHa, as in the case of the vehicle velocity V, the membership functions for defining the five fuzzy sets S, MS, M, MB and B are stored in the ROM.

Referring to FIG. 6, the membership function hs for defining the fuzzy set S is set so that its adaptation degree decreases from 1.0 to 0 as the vehicle velocity V increases from 0% to 25%, and the membership function hms (hm, hmb) for defining the fuzzy set MS (M, MB) is set so that its adaptation degree increases from 0 to 1.0 as the vehicle velocity V increases from 0% (25%, 50%) to 25% (50%, 75%), and decreases from 1.0 to 0 as the vehicle velocity V increases from 25% (50%, 75%) to 50% (75%, 100%). Further, the membership function hb for defining the fuzzy set B is set so that its adaptation degree increases from 0 to 1.0 as the vehicle velocity V increases from 75% to 100%.

As in the case of the antecedent items of the fuzzy rules, base sets for the three consequent items of the fuzzy rules, that is, the caster $\theta1$, camber $\theta2$, and toe $\theta3$, are individually indicated within the range of 0% to 100%. The relationship between the percentage indication for the caster $\theta1$ and the actual value thereof is set so that the caster $\theta1$ takes a first predetermined value $\theta11$ when it is at 0%, and a second predetermined value $\theta12$ larger than the value $\theta11$ when at 100%. Further, the relationship between the percentage indication for the camber $\theta2$ and the actual value thereof is set so that the camber $\theta2$ takes a positive predetermined value when it is at 0%, and a negative predetermined value when at 100%, with respect to the outer-turn wheels. With respect to the inner-turn wheels, on the other hand, this relationship is set so that the camber $\theta2$ takes a negative predetermined value when it is at 0%, and a positive predetermined value when at 100%. As for the toe $\theta3$ of the outer-turn wheels, moreover, it takes a predetermined value for a toe-out state when it is at 0%, and a predetermined value for a toe-in state when at 100%. In contrast with this, the toe $\theta3$ of the inner-turn wheels takes the predetermined value for the toe-in state when it is at 0%, and the predetermined value for the toe-out state when at 100%.

Figure 7:
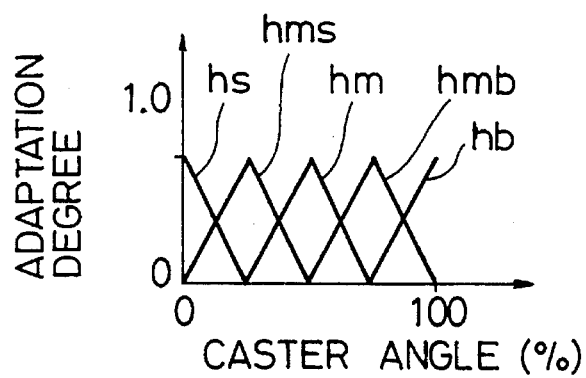
FIG. 7 is a graph showing membership functions associated with a consequent item, a caster angle, of the fuzzy rules.

For the base set associated with the caster $\theta1$, the membership functions hs, hms, hm, hmb and hb for defining the five fuzzy sets S, MS, M, MB and B, respectively, are set in the manner shown in FIG. 7, and are stored in the ROM of the memory 31. The membership functions hs to hb associated with the caster $\theta1$ are set in the same manner as in the case of the vehicle velocity V shown in FIG. 6, and a description of these functions will be omitted.

Figure 8:
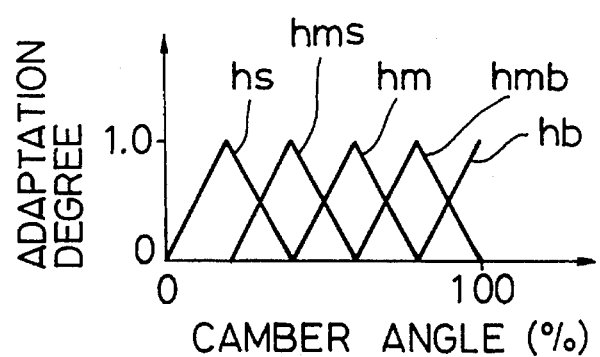
FIG. 8 is a graph showing membership functions associated with a consequent item, a camber angle, of the fuzzy rules.
Figure 9:
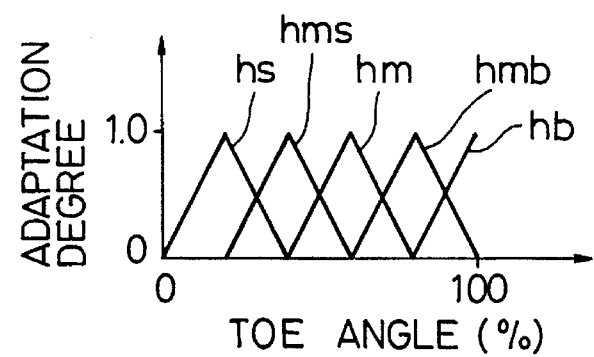
FIG. 9 is a graph showing membership functions associated with a consequent item, a toe angle, of the fuzzy rules.

For the base set associated with the camber $\theta2$ of the outer-turn wheels, moreover, the membership functions hs to hb for defining the five fuzzy sets S to B are defined in the manner shown in FIG. 8, and are stored in the ROM. Also, the membership functions hs to hb for defining the fuzzy sets S to B associated with the toe $\theta3$ of the outer-turn wheels are defined in like manner, as shown in FIG. 9, and are stored in the ROM. For the base set associated with the camber $\theta2$ (toe $\theta3$) of the outer-turn wheels, the membership function hs for defining the fuzzy set S is set so that its adaptation degree increases from 0 to 1.0 as the camber $\theta2$ (toe $\theta3$) increases from 0% to 20%, and decreases from 1.0 to 0 as the camber or toe increases from 20% to 40%. The membership functions hms, hm and hmb are set so that their adaptation degrees increase from 0 to 1.0 as the camber $\theta2$ (toe $\theta3$) increases from 20% (40%, 60%) to 40% (60%, 80%), and decrease from 1.0 to 0 as the camber or toe increases from 40% (60%, 80%) to 60% (80%, 100%). The membership function hb is set so that its adaptation degree increases from 0 to 1.0 as the camber $\theta2$ (toe $\theta3$) increases from 80% to 100%. The membership functions hs, hms, hm, hmb and hb associated with the camber $\theta2$ and toe $\theta3$ of the inner-turn wheels correspond to the membership functions hb, hmb, hm, hms and hs, respectively, for the aforesaid case of the outer-turn wheels.

The following is a description of the operation of the control system constructed in this manner.

Figure 10:
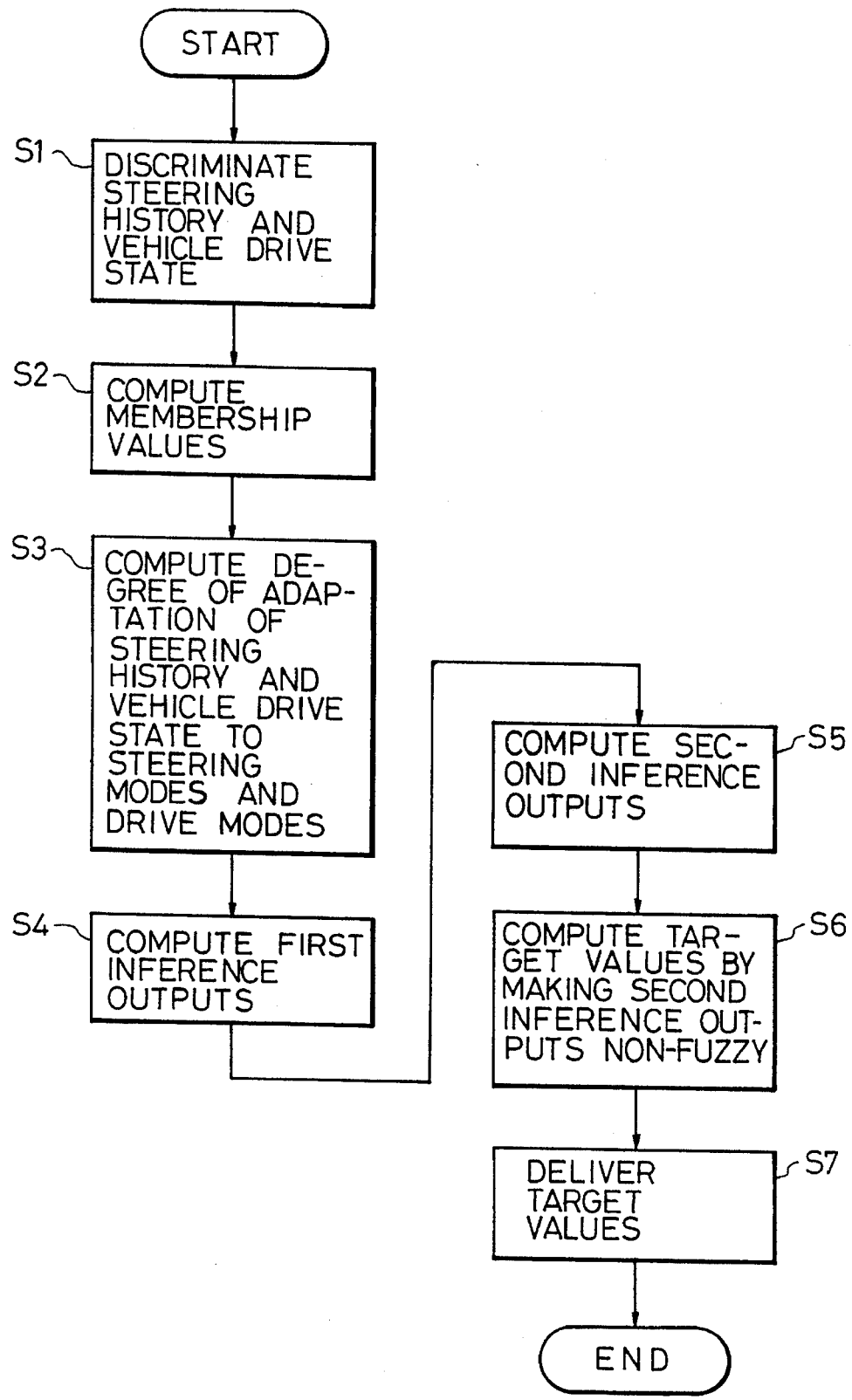
FIG. 10 is a flow chart showing a control program for carrying out the wheel alignment control method according to the first embodiment of the present invention.

When an ignition key of the vehicle is turned on, the processor 32 of the controller 30 starts executing the wheel alignment control program shown in FIG. 10.

The control program of FIG. 10 is executed cyclically. In each execution cycle, the processor 32 reads outputs from the vehicle velocity sensor 34, transverse acceleration sensor 35, longitudinal acceleration sensor 36, and steering sensor 37, then computes the steering-wheel angular speed DHa and discriminates the direction of vehicle revolution, on the basis of the steering-wheel angles for the preceding and present cycles, and further computes the first and second steering frequencies Nha and Ndha (Step S1).

Figure 11:
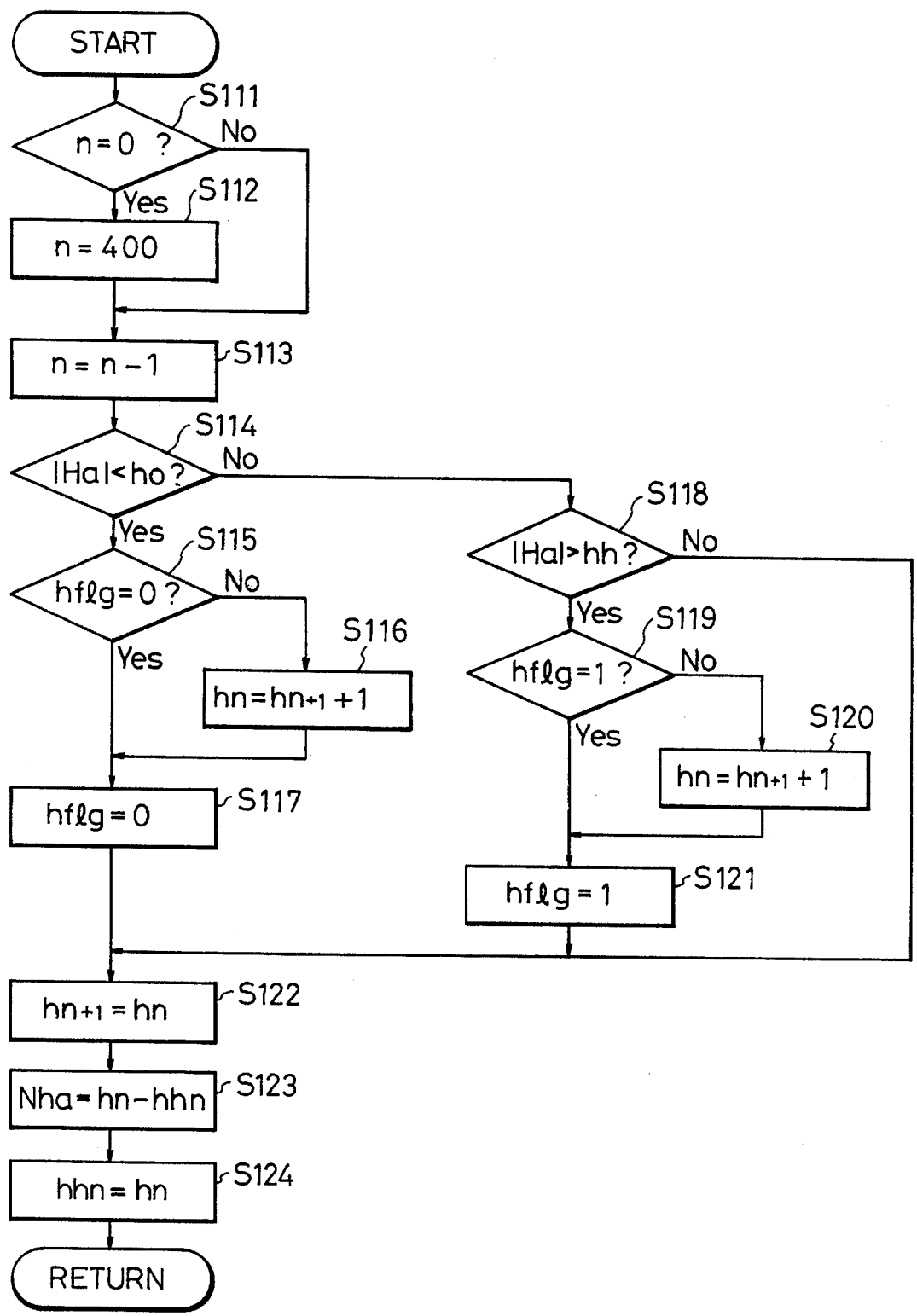
FIG. 11 is a flow chart showing in detail a subroutine for computing the first steering frequency in a steering history discrimination step shown in FIG. 10.
Figure 12:
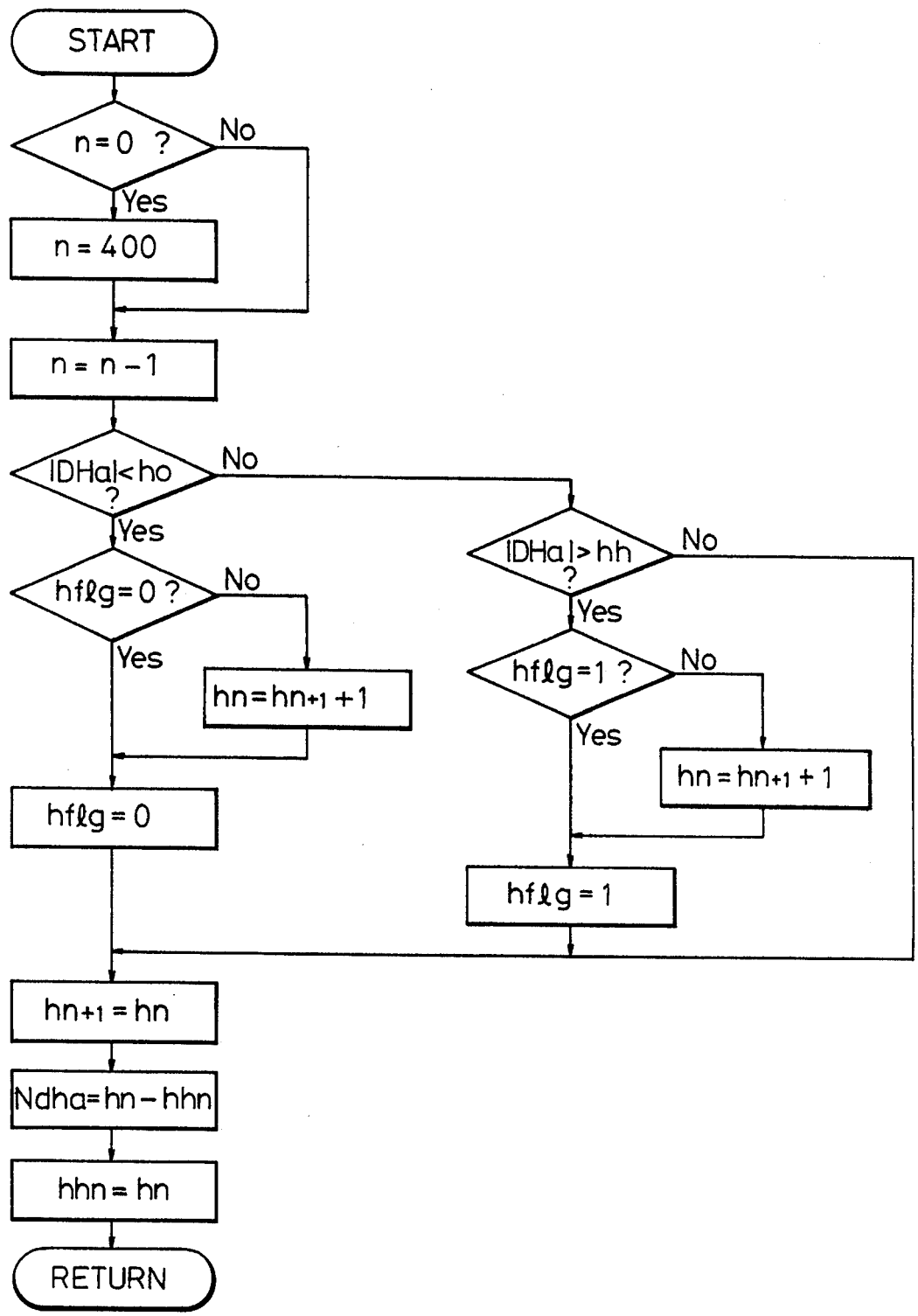
FIG. 12 is a flow chart showing in detail a subroutine for computing the second steering frequency.

The first and second steering frequencies Nha and Ndha are computed following the procedures shown in FIGS. 11 and 12, respectively. In the present embodiment, the number of changes of the steering-wheel angle Ha between a region for an angle narrower than 5° and a region for an angle wider than 20°, made during the past 20 seconds, is regarded as the first steering frequency Nha for the present point of time. Further, the number of changes of the steering-wheel angular speed DHa between a region for a speed lower than 10°/sec and a region for a speed higher than 100°/sec, made during the past 20 seconds, is regarded as the second steering frequency Ndha for the present point of time.

Referring to FIG. 11, there is shown a computation subroutine for the first steering frequency Nha executed in cycles of 50 msec. In this subroutine, the processor 32 of the controller 30 determines whether or not a count value n in a down counter (not shown) for counting 20 seconds is 0 (Step S111). If the result of decision in this step is YES, the processor 32 sets the count value n at 400 which corresponds to 20 seconds (Step S112), and then decrements it by 1 (Step S113). If the result of decision in Step S111 is NO, on the other hand, the processor 32 proceeds to Step S113 without executing Step S112.

Subsequently, the processor 32 determines whether or not the absolute value |Ha| of the steering-wheel angle Ha is smaller than a first predetermined value ho (Step S114). If the result of decision in this step is YES, the processor 32 further determines whether or not the value of a flag hflg is 0 (Step S115). The flag hflg, which is indicative of the steering-wheel for the preceding cycle, takes the value 0 if the absolute value |Ha| of the steering-wheel angle is lower than 5°. If the value |Ha| is higher than 20°, on the other hand, the flag hflg takes the value 1. If the flag hflg is not at 0, that is, if it is concluded that the present and preceding steering-wheel angles are narrower than 5° and wider than 20°, respectively, the processor 32 adds 1 to a cumulative steering frequency hn+1 up to the preceding cycle, thereby obtaining a cumulative steering frequency hn up to the present cycle (Step S116), and loads a register (not shown) with the computed frequency hn. Then, in order to remember that the present steering-wheel angle is narrower than 5°, for the execution of Step S115 or S119 (mentioned later) in the next cycle, the processor 32 resets the flag hflg to 0 (Step S117). If it is concluded in Step S115 that the flag hflg is at 0, on the other hand, the processor 32 proceeds directly to Step S117 without updating the steering frequency.

If it is concluded in Step S114 that the absolute value |Ha| of the steering-wheel angle is not lower than the first predetermined value ho (5°), the processor 32 determines whether or not the absolute value |Ha| exceeds a second predetermined value hh (20°) (Step S118). If the result of decision in this step is YES, the processor 32 further determines whether or not the value of the flag hflg is 1 (Step S119). If the flag hflg is not at 1, that is, if it is concluded that the present and preceding steering-wheel angles are wider than 20° and narrower than 5°, respectively, the processor 32 adds 1 to the cumulative steering frequency hn+1 up to the preceding cycle, thereby obtaining the cumulative steering frequency hn up to the present cycle (Step S120), and loads the register with the computed frequency hn. Then, in order to remember that the present steering-wheel angle is wider than 20°, for the execution of Step S115 or S119 in the next cycle, the processor 32 sets the flag hflg at 1 (Step S121). If it is concluded in Step S119 that the flag hflg is at 1, on the other hand, the processor 32 proceeds directly to Step S121 without updating the steering frequency.

In Step S122 which directly follows Step S117 or S121, the processor 32 stores the cumulative steering frequency hn up to the present cycle as the cumulative steering frequency hn+1 for the execution of Step S116 or S120 in the next cycle. Then, the processor 32 reads a cumulative steering frequency hhn up to the time point 20 seconds before the present point of time from a previously set memory region of the RAM, and subtract the value hhn from the cumulative steering frequency hn up to the present point of time, thereby obtaining the first steering frequency Nha for the present cycle (Step S123). Finally, the processor 32 applies the value hn as the value hhn to a predetermined memory region, in order to make Step S123 in the next cycle executable (Step S124).

The second steering frequency Ndha is computed following the same procedure (FIG. 12) as that for the first steering frequency Nha shown in FIG. 11. Therefore, a detailed description of the computation procedure for the second steering frequency will be omitted. In the computation of the second steering frequency, first and second predetermined angular speed values ho (10°/sec) and hh (100°/sec) are used in place of the first and second predetermined angle values ho (5°) and hh (20°), respectively.

Referring again to FIG. 10, the processor 32 reads the sensor outputs and computes the steering-wheel angular speed and the first and second steering frequencies in Step S1, thereby detecting first and second steering frequencies Nha(t) and Ndha(t), vehicle velocity V(t), and absolute values |Yg(t)|, |Xg(t)|, |Ha(t)| and |DHa(t)| of the transverse acceleration, longitudinal acceleration, steering-wheel angle, and steering-wheel angular speed at present point of time t. As indicated by marks on the respective axes of abscissa of the graphs of FIGS. 13(a) to 13(g), for example, Nha(t)=40 cycles, Ndha(t)=20 cycles, V(t)=10%, |Yg(t)|=10%, |Xg(t)|=0%, |Ha(t)|=85%, and |DHa(t)|=90% are detected. In this manner, the vehicle conditions (steering history and vehicle drive state) for the present point of time are discriminated.

Subsequently, the processor 32 executes fuzzy inference based on the detected steering history and vehicle drive state (Nha(t), Ndha(t), V(t), |Yg(t)|, |Xg(t)|, |Ha(t)|, |DHa(t)|) and the first to thirteenth fuzzy rules (Table 1) which correspond individually to the six steering modes and the seven vehicle drive modes. The fuzzy inference according to the present embodiment is executed by the max-min composition center of gravity method.

In this fuzzy inference, the processor 32 determines the degrees of adaptation of the measured values Nha, Ndha, V, |Yg|, |Xg|, |Ha| and |DHa| to each of the fuzzy sets S to B in the associated base sets, with respect to the antecedent items of the fuzzy rules. Thus, specific numerical values (real numbers 0 to 1) are computed as membership values corresponding to the individual measured values by means of the membership functions corresponding individually to the fuzzy sets S to B (Step S2).

Figure 13A:
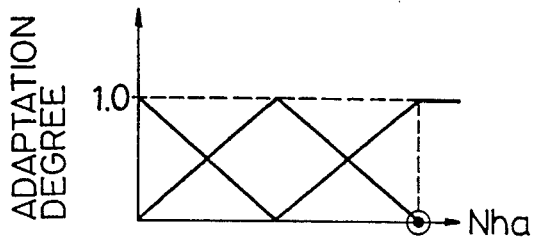
FIGS. 13(a) to 13(g) are graphs showing processes for computing membership values corresponding to a steering historical state and vehicle drive state at a certain point of time and associated with the first and second steering frequencies, vehicle velocity, transverse acceleration, longitudinal acceleration, steering-wheel angle, and steering-wheel angular speed, respectively.
Figure 13B:
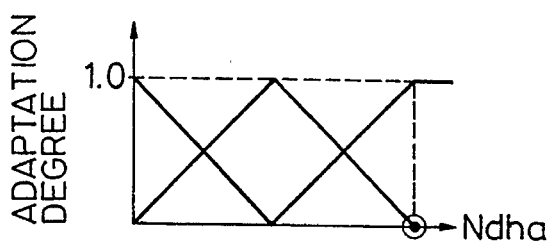
Figure 13C:
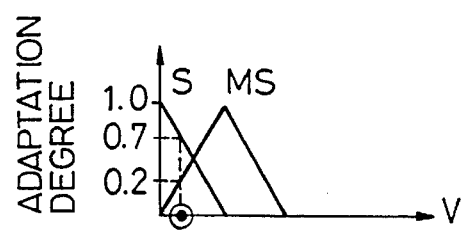
Figure 13D:
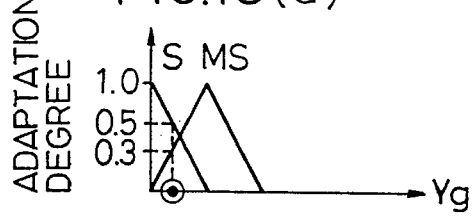
Figure 13E:
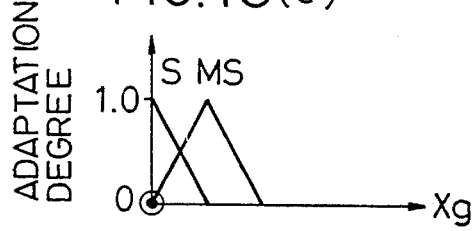
Figure 13F:
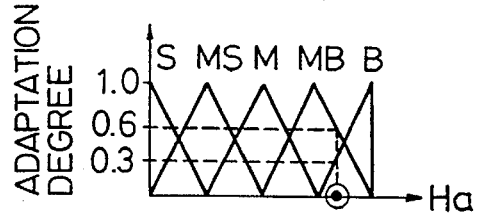
Figure 13G:
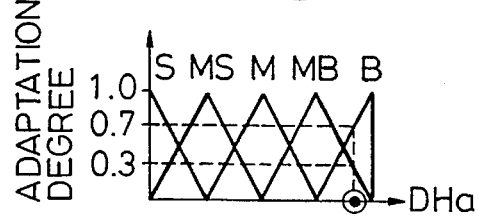

Under the detected vehicle drive state, Nha(t)=40 cycles, Ndha(t)=20 cycles, V(t)=10%, |Yg(t)|=10%, |Xg(t)|=0%, |Ha(t)|=85%, and |DHa(t)|=90% are given, for example. Where the first steering frequency Nha is at 40 cycles, it belongs only to the fuzzy set B, and the degree of adaptation of Nha to B, that is, membership value, is obtained at 1.0, as shown in FIG. 13(a). Likewise, where the second steering frequency Ndha is at 20 cycles, it belongs only to the fuzzy set B, and its membership value is obtained at 1.0, as shown in FIG. 13(b). Where the vehicle velocity V is at 10%, moreover, it belongs to the fuzzy sets S and MS, and its membership values are obtained individually at 0.7 and 0.2, as shown in FIG. 13(c). Where the absolute value |Yg| of the transverse acceleration is at 10%, furthermore, it belongs to the fuzzy sets S and MS, and the membership values of |Yg| for S and MS are obtained at 0.5 and 0.3, respectively, as shown in FIG. 13(d). Where the absolute value |Xg| of the longitudinal acceleration is at 0%, it belongs only to the fuzzy set S, and the membership value of |Xg| for S is obtained at 1.0 at this time, as shown in FIG. 13(e). Where the absolute value |Ha| of the steering-wheel angle is at 85%, moreover, it belongs to the fuzzy sets MB and B, and the membership values of |Ha| for MB and B are obtained at 0.6 and 0.3, respectively, as shown in FIG. 13(f). Where the absolute value |DHa| of the steering-wheel angular speed is at 90%, it belongs to the fuzzy sets MB and B, and the membership values of |DHa| for MB and B are obtained at 0.3 and 0.7, respectively, as shown in FIG. 13(g). Since the vehicle velocity V through the absolute value |DHa| of the steering-wheel angular speed do not belong to any other fuzzy sets than the aforesaid ones, membership values for other fuzzy sets are all 0.

Then, the processor 32 min-integrates the membership values, computed in the aforesaid manner, for all the antecedent items of the fuzzy rules, and obtains the degrees of adaptation of the detected steering historical state and measured vehicle drive state to six steering historical states and seven drive modes, defined by the first to thirteenth fuzzy rules (Step S3).

In the example described above, the first steering frequency Nha belongs only to the fuzzy set B. With respect to the antecedent of the first fuzzy rule, therefore, the degree of adaptation to the fuzzy set B, that is, the membership value 1.0, serves directly as the degree of adaptation of a measured steering state to the first steering mode, and the adaptation degrees of the second and third steering modes corresponding to the second and third fuzzy rules are 0.

Likewise, the second steering frequency Ndha belongs only to the fuzzy set B. With respect to the antecedent of the fourth fuzzy rule, therefore, the degree of adaptation to the fuzzy set B, that is, the membership value 1.0, serves directly as the degree of adaptation of the measured steering state to the fourth steering mode, and the adaptation degrees of the fifth and sixth steering modes corresponding to the fifth and sixth fuzzy rules are 0.

With respect to the seventh fuzzy rule, the vehicle velocity V belongs to the fuzzy set S, and the antecedent of this rule includes only the item associated with S, so that the degree of adaptation of V to S, that is, the membership value 0.7, serves directly as the degree of adaptation of the actual drive state to the very-low-speed drive mode.

With respect to the eighth fuzzy rule, moreover, it is determined whether or not the respective absolute values |Yg|, |Ha| and |DHa| of the transverse acceleration, steering-wheel angle, and steering-wheel angular speed belong to the fuzzy sets S, B and B, respectively, as well as whether or not the vehicle velocity V belongs to the fuzzy set MS. Here the degrees of adaptation of V, |Yg|, |Ha| and |DHa| to the fuzzy sets are obtained as membership values at 0.2., 0.5, 0.3 and 0.7, respectively, and these values are min-integrated. Thereupon, the minimum value, 0.2, is selected to be the degree of adaptation of the drive state to the first urban district drive mode.

In each of the ninth to thirteenth fuzzy rules, some one of the membership values associated with the individual items is 0, so that the min-integration allows the degrees of adaptation of the drive state to the remaining drive modes, from the second urban district drive mode to the thruway drive mode, to be all 0.

Figure 14:
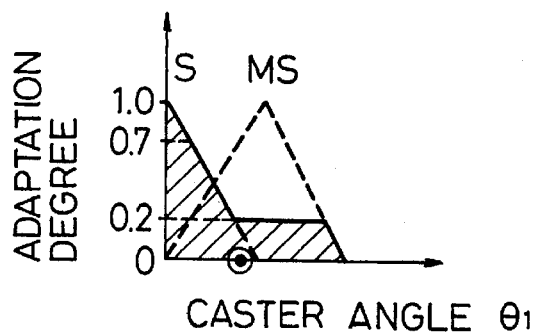
FIG. 14 is a graph illustrating a second inference output associated with the caster angle and a target caster angle value obtained by making the second inference output non-fuzzy, these values being obtained during the execution of the control program of FIG. 10.
Figure 15:
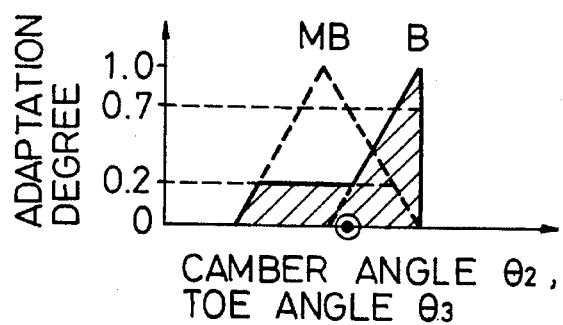
FIG. 15 is a graph illustrating second inference outputs associated with the camber angle and toe angle and a target camber angle value.

Subsequently, the processor 32 cuts the membership functions corresponding individually to the consequent items (caster θ1, camber θ2, and toe θ3) of the fuzzy rules, with use of the adaptation degrees obtained in the aforesaid manner, and obtains inference outputs (hereinafter referred to as first inference outputs) for the individual consequent items of the fuzzy rules (Step S4). In the example described above, the adaptation degree of the first rule is 1.0, so that a first inference output for the caster θ1 of the first rule, which corresponds to the right-angled triangle on the left-hand side of FIG. 14, and first inference outputs for the camber θ2 and toe θ3 (corresponding to the outer-turn wheels) of the second rule, which correspond to the right-angled triangle on the right-hand side of FIG. 15, are obtained. Since the adaptation degree of the fourth rule is 1.0, the same first inference outputs for the aforesaid case of the first rule are obtained for the caster θ1, camber θ2, and toe θ3 of the fourth rule. Since the adaptation degree of the seventh rule is 0.7, moreover, a first inference output for the caster θ1 of the seventh rule, which corresponds to the trapezoid constituting part of the triangle on the left-hand side of FIG. 14, and first inference outputs for the camber θ2 and toe θ3 (corresponding to the outer-turn wheels) of the seventh rule, which correspond to the trapezoid constituting part of the triangle on the right-hand side of FIG. 15, are obtained. Since the adaptation degree of the eighth rule is 0.2, furthermore, a first inference output for the caster θ1 of the eighth rule, which corresponds to the trapezoid on the right-hand side of FIG. 14, and first inference outputs for the camber θ2 and toe θ3 (corresponding to the outer-turn wheels) of the eighth rule, which correspond to the trapezoid on the left-hand side of FIG. 15, are obtained. First inference outputs for the camber θ2 and toe θ3 of the inner-turn wheels are obtained in like manner.

Then, the processor 32 max-integrates the first inference outputs for all the fuzzy rules (here first, fourth, seventh, and eighth rules), and obtains inference outputs (hereinafter referred to as second inference outputs) for the consequent items θ1, θ2 and θ3 of the fuzzy rules (Step S5). As is evident from the above description, the second inference output for the caster θ1 corresponds to the hatched figure in FIG. 14, while the second inference outputs for the camber θ2 and toe θ3 correspond to the hatched figure in FIG. 15. Second inference outputs for the camber θ2 and toe θ3 of the inner-turn wheels are obtained in like manner.

Subsequently, the processor 32 computes the center of gravity of the hatched figure of FIG. 14, makes the second inference output for the caster θ1 non-fuzzy, and determines a target value θt1 (indicated by the mark on the axis of abscissa of the graph of FIG. 14) of the caster θ1. Also, the processor 32 computes the center of gravity of the hatched figure of FIG. 15, makes the second inference outputs for the camber θ2 and toe θ3 non-fuzzy, and determines target values θt2 and θt3 (indicated by the mark on the axis of abscissa of the graph of FIG. 15) of the camber θ2 and toe θ3 (Step S6).

Finally, the processor 32 delivers control outputs indicative of the target values θt1, θt2 and θt3 to the driver circuit 40 (Step S7). Under the control of the driver circuit 40 which responds to the control outputs, the first to third operating sections D1 to D3 (FIG. 1) are driven to extend and contract or hold the respective arms of the first to third actuators. Thus, the caster θ1, camber θ2, and toe θ3 of each front wheel and the camber θ2 of each rear wheel are adjusted to their respective target values. During the execution of this control, sensor outputs from the displacement sensor 42 and the like, which are indicative of the respective arm lengths (corresponding to the actual values of the caster θ1, camber θ2, and toe θ3) of the actuators of the first to third operating sections D1 to D3, are fed back to the processor 32. Thus, after their target values are set by fuzzy inference, the caster θ1, camber θ2, and toe θ3 are feedback-controlled by some suitable means, such as the conventional PI control, so that the sensor outputs are approximated to their respective target values.

Accordingly, fine wheel alignment control can be effected in accordance with the current steering history and vehicle drive state, so that optimum wheel alignment can be executed on the basis of the degrees of adaptation of the current steering history and vehicle drive state to the six steering modes and the seven vehicle drive modes. In the example described above, it is concluded that the current steering history coincides with the first and fourth steering modes, and the current vehicle drive state is considerably adaptive to the very-low-speed drive mode (adaptation degree: 0.7) and somewhat adaptive to the first urban district drive mode (adaptation degree: 0.2), but is not adaptive to the remaining four steering modes and five drive modes at all. As a result, the wheel alignment can be achieved attaching importance to manageability.

The following is a description of a wheel alignment control method according to a second embodiment of the present invention.

The present embodiment is designed so that the degree of adaptation of an actual vehicle velocity and steering state to a preset high-speed steering-hold mode and the degree of adaptation of an actual vehicle drive state to each of preset vehicle drive modes are obtained by fuzzy inference, inference outputs reflective of the adaptation degrees are further obtained, and alignment parameters are adjusted to target values determined in accordance the inference outputs, whereby wheel alignment can be effected properly.

In the present embodiment, the high-speed steering-hold state is discriminated on the basis of the vehicle velocity V, absolute value |Ha| of the steering wheel angle, and frequency of steering (hereinafter referred to as steering frequency) Ndha covering a predetermined steering angular speed or higher speed within a given time, for use as fuzzy variables. As in the case of the first embodiment, moreover, the vehicle drive state is discriminated on the basis of the vehicle velocity V and the respective absolute values |Yg|, |Xg|, |Ha| and |DHa| of the transverse acceleration, longitudinal acceleration, steering-wheel angle, and steering-wheel angular speed, for use as fuzzy variables. Prearranged, as in the case of the first embodiment, are a plurality of vehicle drive modes including a very-low-speed drive mode, first and second urban district drive modes, a suburb drive mode, first and second mountain road drive modes, and a thruway drive mode. As mentioned later, the high-speed steering-hold mode or each of the drive modes is represented by a fuzzy set or a combination of fuzzy sets associated with the fuzzy variables. In the present embodiment, as in the first embodiment, a camber, caster, and toe, as front wheel alignment parameters, and a camber as a rear wheel alignment parameter are variably adjusted.

Since the alignment control method according to the present embodiment can be executed by means of a control system which is arranged substantially in the same manner the one shown in FIGS. 1 to 3, a description of the control system will be omitted.

In connection with the fuzzy inference function of the control system, as in the case of the first embodiment, the ROM of the memory 31 of the controller 30 is loaded with eight fuzzy rules described in IF-THEN form, as shown in Table 3 below.

TABLE 3

| | Antecedent | | | | | | Consequent | | |
|---|---|---|---|---|---|---|---|---|---|
| | Ndha | V | |Yg| | |Xg| | |Ha| | |DHa| | θ1 | θ2, | θ3 |
| High-speed steering-hold (mode) | S' | M' | — | — | M' | — | S | — | — |
| Very-low-speed (drive mode) | — | S | — | — | — | — | S | — | B |
| First urban district | — | MS | S | — | B | B | M S | — | M B |
| Second urban district | — | MS | — | — | MB | M | M | — | M |
| Suburb | — | MB | M | — | — | MB | M | — | M |
| First mountain road | — | M | MB | MB | MB | M | M S | — | M B |
| Second mountain road | — | MB | B | — | M | MS | M B | — | M S |
| Thruway | — | B | MS | S | S | S | B | — | S |

In Table 3, a first fuzzy rule, "If Ndha=S', V=M' and DHa=M', then θ1=S," which corresponds to the high-speed steering-hold mode, indicates that if the steering frequency is low, corresponding to a fuzzy set S', if the vehicle velocity is higher than a medium speed, corresponding to a fuzzy set M', and if the absolute value of the steering wheel angle is larger than a medium value, corresponding to the fuzzy set M', then the caster θ1 is made small, corresponding to the fuzzy set S.

Second to eighth fuzzy rules correspond to the seventh to thirteenth fuzzy rules (Table 2), respectively, of the first embodiment, and a description of those rules will be omitted.

As in the case (Table 2) of the first embodiment, a base set for the antecedent item, steering frequency Ndha, of the fuzzy rules is indicated within the range of 0 cycle to 100 cycles. Base sets for the remaining antecedent items of the fuzzy rules, that is, the vehicle velocity V and the absolute values |Yg|, |Xg|, |Ha| and |DHa| of the transverse acceleration, longitudinal acceleration, steering-wheel angle, and steering-wheel angular speed, are individually indicated within the range of 0% to 100%.

Figure 16:
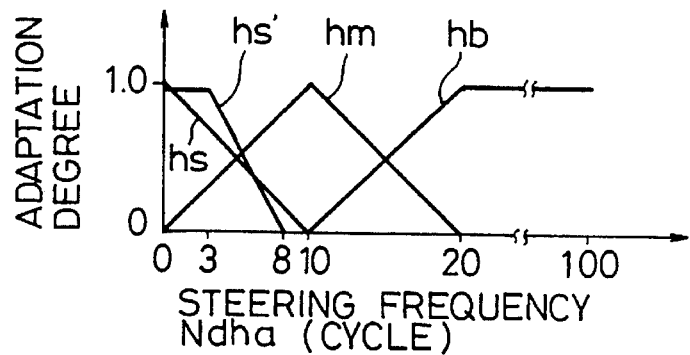
FIG. 16 is a graph showing membership functions associated with an antecedent item, a steering frequency, of fuzzy rules used for fuzzy inference for carrying out a wheel alignment control method according to a second embodiment of the present invention.

For the base set associated with the steering frequency Ndha, moreover, membership functions hs, hs', hm and hb for defining the fourth fuzzy sets S, S', M and B, respectively, are set in the manner shown in FIG. 16, and are stored in the ROM of the memory 31. Referring to FIG. 16, the membership function hs for defining the fuzzy set S is set so that its membership value or adaptation degree decreases from 1.0 to 0 as the steering frequency Ndha increases from 0 cycle to 10 cycles, and the membership function hs' for defining the fuzzy set S' is set so that its adaptation degree is 1.0 as the steering frequency Ndha ranges from 0 cycle to 3 cycles, and decreases from 1.0 to 0 as the steering frequency increases from 3 cycles to 8 cycles. Further, the membership function hm for defining the fuzzy set M is set so that its adaptation degree increases from 0 to 1.0 as the steering frequency Ndha increases from 0 cycle to 10 cycles, and decreases from 1.0 to 0 as the steering frequency increases from 10 to 20 cycles. Furthermore, the membership function hb for defining the fuzzy set B is set so that its adaptation degree increases from 0 to 1.0 as the steering frequency increases from 10 cycles to 20 cycles, and is 1.0 as the steering frequency ranges from 20 cycles to 100 cycles.

Figure 17:
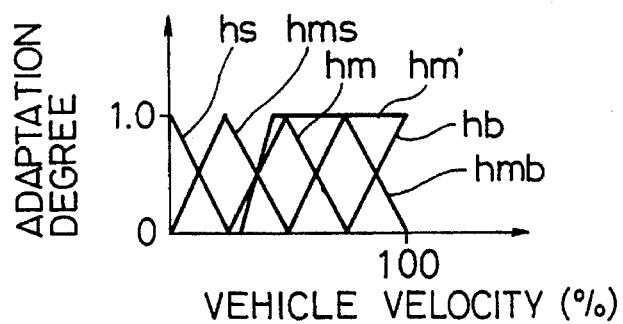
FIG. 17 is a graph showing membership functions associated with an antecedent item, a vehicle velocity, of the fuzzy rules.

For the base set associated with the vehicle velocity V, moreover, membership functions hs, hms, hm, hm', hmb and hb for defining the six fuzzy sets S, MS, M, M', MB and B, respectively, are set in the manner shown in FIG. 17, and are stored in the ROM. Since the membership functions hs, hms, hm, hmb and hb for defining the fuzzy sets S, MS, M, MB and B are set in the same manner as in the case (FIG. 6) of the first embodiment, a detailed description of those membership functions will be omitted. The membership function hm' for defining the fuzzy set M' is set so that its adaptation degree increases from 0 to 1.0 as the vehicle velocity increases from 32% (80 km/h) to 38% (95 km/h), and is 1.0 when the vehicle velocity is not lower than 38%.

Figure 18:
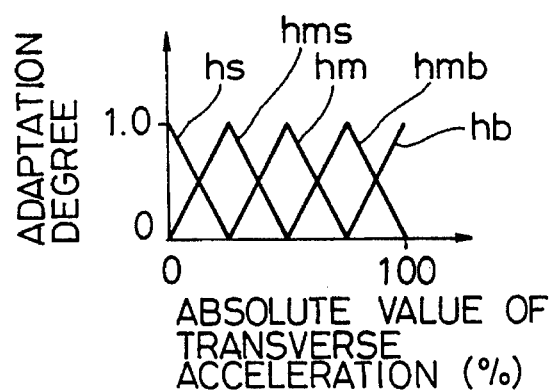
FIG. 18 is a graph showing membership functions associated with an antecedent item, the absolute value of a transverse acceleration, of the fuzzy rules.

For the base set associated with each of the absolute values |Yg|, |Xg| and |DHa| of the transverse acceleration, longitudinal acceleration, and steering-wheel angular speed, substantially as in the case of the vehicle velocity, the membership functions hs, hms, hm, hmb and hb for defining the five fuzzy sets S, MS, M, MB and B are set and stored in the ROM. FIG. 18 shows five membership functions associated with the absolute value |Yg| of the transverse acceleration.

Figure 19:
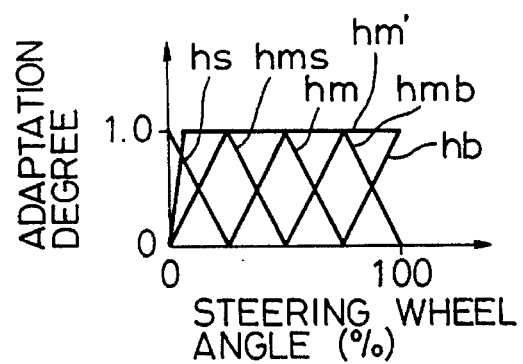
FIG. 19 is a graph showing membership functions associated with an antecedent item, the absolute value of a steering-wheel angle, of the fuzzy rules.

For the base set associated with the absolute value |Ha| of the steering-wheel angle, the membership functions hs, hms, hm, hm', hmb and hb for defining the six fuzzy sets S, MS, M, M', MB and B, respectively, are set in the manner shown in FIG. 19, and are stored in the ROM. The membership function hm' is set so that its adaptation degree increases from 0 to 1.0 as the absolute value |Ha| of the steering-wheel angle increases from 0% to about 3% (12°), and is 1.0 when the absolute value of the steering-wheel angle exceeds 12°.

As in the case of the antecedent items of the fuzzy rules, base sets for the three consequent items of the fuzzy rules, that is, the caster θ1, camber θ2, and toe θ3, are individually indicated within the range of 0% to 100%. The relationships between the percentage indications for the caster θ1, camber θ2, and toe θ3 and the actual values are the same as in the case of the first embodiment, and a description of those relationships will be omitted. Further, the membership functions for defining the fuzzy sets associated individually with the caster θ1 and the camber θ2 and toe θ3 of the outer-turn wheels are set in the same manner as in the case (FIGS. 7 to 9) of the first embodiment, and illustration and description of those functions will be omitted. Also, the membership functions for the camber θ2 and toe θ3 of the inner-turn wheels are set in the same manner as in the case of the first embodiment, and a description of those functions will be omitted.

The following is a description of the operation of the control system.

Figure 20:
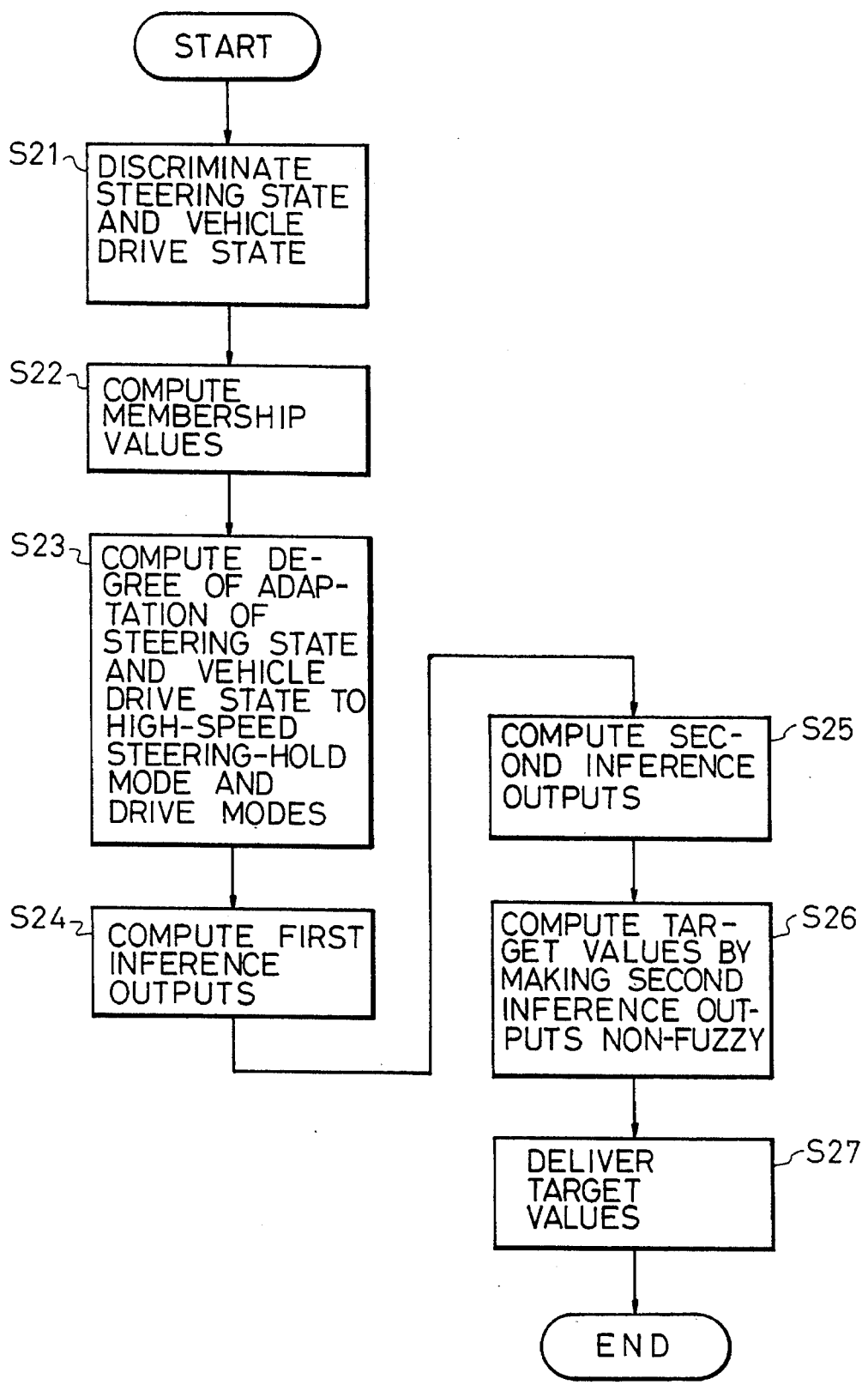
FIG. 20 is a flow chart showing a control program for carrying out the wheel alignment control method according to the second embodiment of the present invention.

When the ignition key of the vehicle is turned on, the processor 32 of the controller 30 starts executing the wheel alignment control program shown in FIG. 20 (corresponding to the program of FIG. 11).

The control program of FIG. 20 is executed cyclically. In each execution cycle, the processor 32 reads outputs from the vehicle velocity sensor 34, transverse acceleration sensor 35, longitudinal acceleration sensor 36, and steering sensor 37, then computes the steering-wheel angular speed DHa and discriminates the direction of vehicle revolution, on the basis of the steering-wheel angles for the preceding and present cycles, and further computes the steering frequency Ndha (Step S21).

The steering frequency Ndha, which corresponds to the second steering frequency Ndha according to the first embodiment, is computed following the same procedure as the one shown in FIG. 12. Therefore, a description of the computation procedure for the steering frequency Ndha will be omitted.

Referring again to FIG. 20, the processor 32 reads the sensor outputs and computes the steering-wheel angular speed and the steering frequency in Step S21, thereby detecting the steering frequency Ndha(t), vehicle velocity V(t), and absolute values |Yg(t)|, |Xg(t)|, |Ha(t)| and |DHa(t)| of the transverse acceleration, longitudinal acceleration, steering-wheel angle, and steering-wheel angular speed at the present point of time t. As indicated by marks on the respective axes of abscissa of the graphs of FIGS. 21(a) to 21(f), for example, Ndha(t)=3 cycles, V(t)=75%, |Yg(t)|= 75%, |Xg(t)|=0%, |Ha(t)|=62.5%, and |DHa(t)|=25% are detected. In this manner, the vehicle conditions (steering state and vehicle drive state) for the present point of time are discriminated.

Subsequently, the processor 32 executes fuzzy inference based on the detected steering state and vehicle drive state (Ndha(t), V(t), |Yg(t)|, |Xg(t)|, |Ha(t)|, |DHa(t)|) and the first to eighth fuzzy rules (Table 3) which correspond individually to the high-speed steering-hold mode and the seven vehicle drive modes. The fuzzy inference according to the present embodiment is executed by the min-max composition center of gravity method.

In this fuzzy inference, the processor 32 determines the degrees of adaptation of the measured values Ndha, V, |Yg|, |Xg|, |Ha| and |DHa| to each of the fuzzy sets S to B in the associated base sets, with respect to the antecedent items of the fuzzy rules. Thus, specific numerical values (real numbers 0 to 1) are computed as membership values corresponding to the individual measured values by means of the membership functions corresponding individually to the fuzzy sets S to B (Step S22).

Figure 21A:
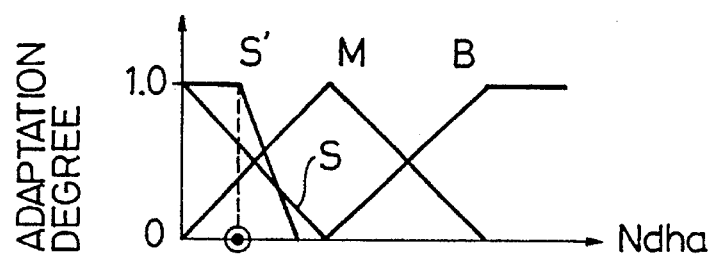
FIGS. 21(a) to 21(f) are graphs showing processes for computing membership values corresponding to a steering state and vehicle drive state at a certain point of time and associated with the steering frequency, the vehicle velocity, and the respective absolute values of the transverse acceleration, longitudinal acceleration, steering-wheel angle, and steering-wheel angular speed, respectively.
Figure 21B:
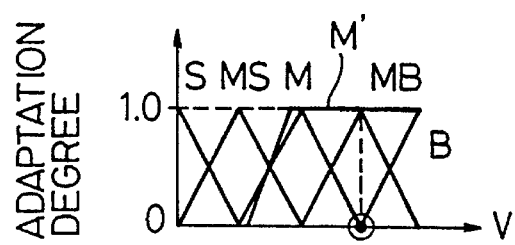
Figure 21C:
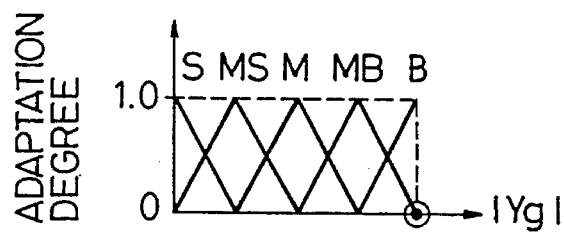
Figure 21D:
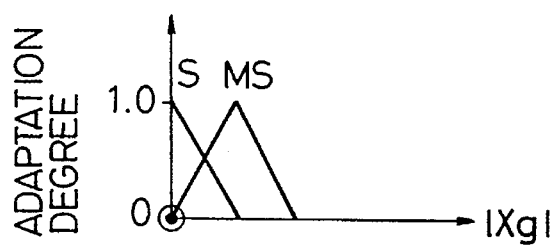
Figure 21E:
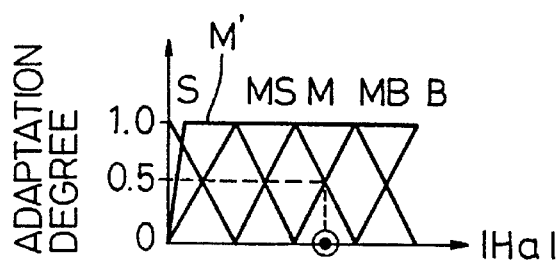
Figure 21F:
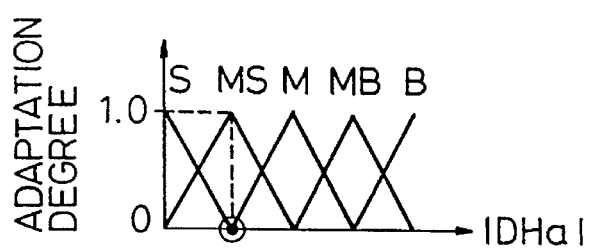

Under the detected vehicle drive state, Ndha(t)=3 cycles, V(t)=75%, |Yg(t)|=75%, |Xg(t)|=0%, |Ha(t)|=62.5%, and |DHa(t)|=25% are given, for example. Where the steering frequency Ndha is 3 cycles, it belongs to the fuzzy sets S', S and M, and its membership values are obtained individually at 1.0, 0.6 and 0.4, as shown in FIG. 21(a). Where the vehicle velocity V is 75%, moreover, it belongs to the fuzzy sets M' and MB, and its membership values are obtained individually at 1.0 and 1.0, as shown in FIG. 21(b). Where the absolute value |Yg| of the transverse acceleration is 75%, furthermore, it belongs to the fuzzy set B, and the membership value of |Yg| for B is obtained at 1.0, as shown in FIG. 21(c). Where the absolute value |Xg| of the longitudinal acceleration is 0%, it belongs only to the fuzzy set S, and the membership value of |Xg| for S is obtained at 1.0 at that time, as shown in FIG. 21(d). Where the absolute value |Ha| of the steering-wheel angle is 62.5%, moreover, it belongs to the fuzzy sets M', M and MB, and the membership values of |Ha| for M', M and MB are obtained at 1.0, 0.5 and 0.5, respectively, as shown in FIG. 21(e). Where the absolute value |DHa| of the steering-wheel angular speed is 25%, it belongs only to the fuzzy set MS, and the membership value of |DHa| for MS is obtained at 1.0, as shown in FIG. 21(f). Since the steering frequency Ndha through the absolute value |DHa| of the steering-wheel angular speed do not belong to any other fuzzy sets than the aforesaid ones, membership values for other fuzzy sets are all 0.

Then, the processor 32 min-integrates the membership values, computed in the aforesaid manner, for all the antecedent items of the fuzzy rules, and obtains the degrees of adaptation of the detected steering state and vehicle drive state to the high-speed steering-hold mode and the seven drive modes, defined by the first to eighth fuzzy rules (Step S23).

In the example described above, the steering frequency Ndha, vehicle velocity V. and absolute value |Ha| of the steering-wheel angle belong to the fuzzy sets S', M' and M', respectively, and their respective membership values are 1.0 at that time. Even though the membership values for all the antecedent items of the first fuzzy rule are min-integrated, therefore, the resulting value remains 1.0, which serves as the degree of adaptation of the detected steering state to the high-speed steering-hold mode.

For the second to seventh fuzzy rules, some one of the membership values associated with the individual antecedent items of the rules is 0, so that the min-integration of all the items allows the degrees of adaptation of the detected drive state to the seven drive modes corresponding to these rules to be also 0.

Subsequently, the processor 32 cuts the membership functions corresponding individually to the consequent items (caster θ1, camber θ2, and toe θ3) of the fuzzy rules, with use of the adaptation degrees obtained in the aforesaid manner, and obtains inference outputs (hereinafter referred to as first inference outputs) for the individual consequent items of each fuzzy rule (Step S24). In the example described above, the adaptation degree of the first rule is 1.0, so that a first inference output for the caster θ1 of the first rule, which corresponds to the right-angled triangle on the left-hand side of FIG. 22, is obtained. Since the adaptation degree of the seventh rule is 0.5, moreover, a first inference output for the caster θ1 of the seventh rule, which corresponds to the trapezoid on the right-hand side of FIG. 22, and first inference outputs for the camber θ2 and toe θ3 (corresponding to the outer-turn wheels) of the seventh rule, which correspond to the trapezoid shown in FIG. 23, are obtained. First inference outputs for the camber θ2 and toe θ3 of the inner-turn wheels are obtained in like manner.

Then, the processor 32 max-integrates the first inference outputs for all the fuzzy rules (here, first and seventh rules), and obtains inference outputs (hereinafter referred to as second inference outputs) for the consequent items θ1, θ2 and θ3 of the fuzzy rules (Step S25). As is evident from the above description, the second inference output for the caster θ1 corresponds to the hatched figures in FIG. 22, while the second inference outputs for the camber θ2 and toe θ3 correspond to the hatched trapezoid in FIG. 23. Second inference outputs for the camber θ2 and toe θ3 of the inner-turn wheels are obtained in like manner.

Subsequently, the processor 32 computes the center of gravity of the hatched figures of FIG. 22, makes the second inference output for the caster θ1 non-fuzzy, and determines a target value θt1 (indicated by the mark on the axis of abscissa of the graph of FIG. 22) of the caster θ1. Also, the processor 32 computes the center of gravity of the hatched trapezoid of FIG. 23, makes the second inference outputs for the camber θ2 and toe θ3 non-fuzzy, and determines target values θt2 and θt3 (indicated by the mark on the axis of abscissa of the graph of FIG. 23) of the camber θ2 and toe θ3 (Step S26).

Finally, the processor 32 delivers control outputs indicative of the target values θt1, θt2 and θt3 to the driver circuit 40 (Step S27). Under the control of the driver circuit 40 which responds to the control outputs, as in the case of the first embodiment, the first to third operating sections D1 to D3 (FIG. 1) are driven to extend and contract or hold the respective arms of the first to third actuators. Thus, the caster θ1, camber θ2, and toe θ3 of each front wheel and the camber θ2 of each rear wheel are adjusted to their respective target values.

Accordingly, fine wheel alignment control can be effected in accordance with the current steering state and vehicle drive state, so that optimum wheel alignment can be executed on the basis of the degrees of adaptation of the current steering state and vehicle drive state to the high-speed steering-hold mode and the seven vehicle drive modes. In the example described above, it is concluded that the current steering state coincides with the high-speed steering-hold mode (adaptation degree: 1.0), and the current vehicle drive state is somewhat adaptive to the second mountain road drive mode (adaptation degree: 0.5) and is not adaptive to the remaining six drive modes at all. As a result, the wheel alignment can be achieved attaching importance to a reduction of the steering force for adaptation to the high-speed steering-hold mode. Since the steering frequency Ndha is discriminated in consideration of the steering history in the past 20 seconds, moreover, the degree of adaptation of the first fuzzy rule to the high-speed steering-hold mode gradually increases after the high-speed steering-hold state is entered (see FIG. 24(a)). As a result, the caster θ1 is gradually reduced when the high-speed steering-hold state is entered (FIG. 24(b)), so that a sense of incompatibility attributable to caster adjustment can be prevented. The higher the vehicle velocity V, the lower the rate of reduction of the caster θ1 will be.

The present invention is not limited to the first and second embodiments described above, and various changes and modifications may be effected therein.

In these two embodiments, the target values of the alignment control parameters are determined by the fuzzy inference based on the fuzzy rules and the actual vehicle conditions. Alternatively, however, the target parameter values may be determined by some other methods than the fuzzy inference. As for the first embodiment in which the fuzzy inference is used for the determination of the target values of the alignment control parameters adaptable to the steering history, for example, it may be modified so that alignment parameter values adaptable to various steering histories are previously mapped, and the parameter values are determined in accordance with the discriminated steering history.

Although the fuzzy rules used according to the first and second embodiments are respectively associated with the combinations of the steering modes and the vehicle drive modes or the combinations of the high-speed steering-hold mode and the vehicle drive modes, moreover, the fuzzy rules may be set variously. For example, the first embodiment may be modified so as to use only the seventh to thirteenth fuzzy rules associated with the seven vehicle drive modes shown in Table 1. In this case, the fuzzy inference is executed on the basis of the actual vehicle drive state, which is discriminated by the vehicle velocity and the respective absolute values of the transverse acceleration, longitudinal acceleration, steering-wheel angle, and steering-wheel angular speed, and the seventh to thirteenth fuzzy rules. Alternatively, the fuzzy inference may be executed in accordance with fourteen fuzzy rules which include the first fuzzy rule of Table 3 and the first to thirteenth fuzzy rules of Table 1. In other words, the first and second embodiments may be combined with each other. Although the max-min composition center of gravity method is used for the fuzzy inference in the first and second embodiments, furthermore, the fuzzy inference method for embodying the present invention is not limited to this method.

According to the first and second embodiment, the caster angle, camber angle, and toe angle, for use as the front-wheel alignment control parameters, and the camber angle as the rear-wheel alignment control parameter are variously adjusted. However, the alignment control parameters are not limited to these angles, and various other elements may be selected for the purpose.

In the adjustment for alignment according to the first and second embodiments, moreover, some other suitable actuators may be used in place of the variable-arm-length hydraulic actuators according to the embodiments.

In the first embodiment, furthermore, the steering modes are set in accordance with the degree of fatigue from the steering operation and the perceived difficulty thereof, and the first and second steering frequencies are used as the steering history discrimination parameters. However, the steering modes and the steering history discrimination parameters may be set or selected variously.

What is claimed is:

1. A wheel alignment control method for a motor vehicle, comprising the steps of:

detecting values of a plurality of parameters indicative of a behavior of the vehicle;

estimating a road/traffic condition in which the vehicle runs on the basis of an interrelationship among the detected values of the plurality of parameters;

retrieving a first control output in accordance with at least one control rule corresponding to the estimated road/traffic condition; and determining target values of wheel alignment control variables respectively associated with a camber angle, caster angle, and toe angle of wheels of the vehicle on the basis of the retrieved first control output.

2. The wheel alignment control method according to claim 1, wherein the plurality of parameters indicative of the behavior of the vehicle includes vehicle speed, longitudinal acceleration, lateral acceleration, steering angle, and steering angular speed.

3. A wheel alignment control method for a motor vehicle, comprising the steps of:

detecting values of a plurality of parameters indicative of a behavior of the vehicle;

estimating at least one of a degree of driver fatigue and of a degree of driver perceived difficulty in respect to steering on the basis of an interrelationship among the detected values of a plurality of parameters;

retrieving a second control output in accordance with at least one control rule corresponding to the estimated at least one of a degree of driver fatigue and of a degree of driver perceived difficulty; and determining target values of wheel alignment control variables respectively associated with a camber angle, caster angle, and toe angle of wheels of the vehicle on the basis of the retrieved second control output.

4. The wheel alignment control method according to claim 3, wherein the plurality of parameters indicative of the behavior of the vehicle includes a first steering history indicative of a frequency of steering covering an angle equal to or greater than a predetermined steering angle within a given time, and a second steering history indicative of a frequency of steering covering a speed equal to or greater than a predetermined steering angular speed within a given time.

5. A wheel alignment control method for a motor vehicle, comprising the steps of:

detecting values of a plurality of parameters indicative of a behavior of the vehicle;

estimating a road/traffic condition in which the vehicle runs on the basis of an interrelationship among the detected values of the plurality of parameters;

retrieving a first control output in accordance with at least one control rule corresponding to the estimated road/traffic condition;

estimating at least one of a degree of driver fatigue and of a degree of driver perceived difficulty in respect to steering on the basis of an interrelationship among the detected values of a plurality of parameters;

retrieving a second control output in accordance with at least one control rule corresponding to the estimated at least one of a degree of driver fatigue and of a degree of driver perceived difficulty; and determining target values of wheel alignment control variables respectively associated with a camber angle, caster angle, and toe angle of wheels of the vehicle on the basis of the retrieved first and second control outputs.

6. The wheel alignment control method according to claim 5, wherein the plurality of parameters indicative of the behavior of the vehicle includes vehicle speed, longitudinal acceleration, lateral acceleration, steering angle, steering angular speed, a first steering history indicative of a frequency of steering covering an angle equal to or greater than a predetermined steering angle within a given time, and a second steering history indicative of a frequency of steering covering a speed equal to or greater than a predetermined steering angular speed within a given time.

7. The wheel alignment control method according to claim 1, 3, or 5, wherein:

each of the plurality of parameters has a minimum value and maximum value which define an entire range which is divided into a plurality of partial ranges; and at least one of at least one of a degree of driver fatigue and of a degree of driver perceived difficulty and the road/traffic condition is estimated on the basis of the interrelationship among those partial ranges within which the detected values of the plurality of parameters fall, respectively.

8. The wheel alignment control method according to claim 7, wherein:

each of the alignment control variables has a minimum value and maximum value which define an entire range which is divided into a plurality of partial ranges; and said partial ranges of each of the alignment control variables correspond individually to the estimated state of the driver's mind and/or the estimated road/traffic condition and are selected for the respective alignment control variables, to thereby set the target values of the alignment control variables.

9. The wheel alignment control method according to claim 8, wherein:

the partial ranges of each of the plurality of parameters correspond individually to fuzzy sets with respect to said each parameter which serves as a fuzzy variable;

degrees of adaptation respectively associated with those partial ranges within which the detected values of the plurality of parameters fall, respectively, are calculated; and at least one of at least one of a degree of driver fatigue and of a degree of driver perceived difficulty and the road/traffic condition is estimated on the basis of the calculated degrees of adaptation.

10. The wheel alignment control method according to claim 9, wherein:

the partial ranges of each of the alignment control variables correspond individually to fuzzy sets with respect to each said alignment control variable which serves as a fuzzy variable;

intermediate parameter values respectively associated with the alignment control variables are calculated based on the calculated degrees of adaption, respectively; and the calculated intermediate parameter values are synthesized, to thereby infer the target values of the alignment control variables.

11. The wheel alignment control method according to claim 10, wherein:

the entire range of each of the plurality of parameters is divided into a small level range, a medium small level range, a medium level range, a medium large level range, and a large level range; and the entire range of each of said alignment control variables is divided into a small level range, a medium level range, and a large level range.

12. The wheel alignment control method according to claim 8, wherein:

the plurality of parameters includes vehicle speed;

the partial ranges associated with the vehicle speed include a small level range;

the partial ranges of each of the alignment control variables include a small level range and a medium level range;

a very-low speed drive mode where the vehicle runs at a very low speed is inferred as the road/traffic condition when the vehicle speed falls within the small range;

a control output, corresponding to the first or second control output, is retrieved based on at least one control rule corresponding to the inferred very-low speed drive mode; and that target value of the alignment control variable associated with the caster angle which falls within the small level range and those target values of the alignment control variables respectively associated with the camber and toe angles which fall individually within the medium level ranges are determined based on the retrieved control output.

13. The wheel alignment control method according to claim 8, wherein:

the plurality of parameters includes vehicle speed, lateral acceleration, steering angle, and steering angular speed;

the partial ranges associated with each of the plurality of parameters include a small level range, a medium small level range, and a large level range;

the partial ranges of each of the alignment control variables include a medium large level range;

a first urban district drive mode where the vehicle runs in a relatively-heavy-traffic urban district is inferred as the road/traffic condition when the vehicle speed falls within the medium small level range, the lateral acceleration falls within the small level range, and the steering angle and the steering angular speed fall individually within their large level ranges;

a control output, corresponding to the first or second control output, is retrieved based on at least one control rule corresponding to the inferred first urban district drive mode; and those target values of the alignment control variables respectively associated with the caster, camber and toe angles which fall individually within the medium large level ranges are determined based on the retrieved control output.

14. The wheel alignment control method according to claim 8, wherein:

the plurality of parameters includes vehicle speed, steering angle, and steering angular speed;

the partial ranges associated with each of the plurality of parameters include a medium small level range, a medium level range, and a medium large level range;

the partial ranges of each of the alignment control variables include a medium level range;

a second urban district drive mode where the vehicle runs in a relatively-light-traffic urban district is inferred as the road/traffic condition when the vehicle speed falls within the medium small level range, the steering angle falls within the medium large level range, and the steering angular speed falls within the medium level range;

a control output, corresponding to the first or second control output, is retrieved based on at least one control rule corresponding to the inferred second urban district drive mode; and those target values of the alignment control variables respectively associated with the caster, camber and toe angles which fall individually within the medium level ranges are determined based on the retrieved control output.

15. The wheel alignment control method according to claim 8, wherein:

the plurality of parameters include vehicle speed, lateral acceleration, longitudinal acceleration, and steering angular speed;

the partial ranges associated with each of the plurality of parameters include a medium level range and a medium large level range;

the partial ranges of each of the alignment control variables include a medium level range;

a suburb drive mode where the vehicle runs in a light-traffic suburb is inferred as the road/traffic condition when the vehicle speed and the steering angle speed fall individually within their medium large level ranges and the lateral and longitudinal accelerations fall within their medium level ranges, respectively;

a control output, corresponding to the first or second control output, is retrieved based on at least one control rule corresponding to the inferred suburb drive mode; and those target values of the alignment control variables respectively associated with the caster, camber and toe angles which fall individually within the medium level ranges are determined based on the retrieved control output.

16. The wheel alignment control method according to claim 8, wherein:

the plurality of parameters include vehicle speed, lateral acceleration, longitudinal acceleration, steering angle, and steering angular speed;

the partial ranges associated with each of the plurality of parameters include a medium level range and a medium large level range;

the partial ranges of each of the alignment control variables include a medium small level range and a medium large level range;

a first mountain road drive mode where the vehicle runs on a mountain road winding degree of which is relatively large is inferred as the road/traffic condition when the vehicle speed and the steering angular speed fall within their medium level ranges, respectively, and the lateral acceleration, the longitudinal acceleration and the steering angle fall within their medium large level ranges, respectively;

a control output, corresponding to the first or second control output, is retrieved based on at least one control rule corresponding to the inferred first mountain road drive mode; and that target value of the alignment control variable associated with the caster angle which falls within the medium small level range, and those target values of the alignment control variables respectively associated with the camber and toe angles which fall individually within the medium large level ranges are determined based on the retrieved control output.

17. The wheel alignment control method according to claim 8, wherein:

the plurality of parameters include vehicle speed, lateral acceleration, steering angle, and steering angular speed;

the partial ranges associated with each of the plurality of parameters include a medium small level range, a medium level range, a medium large level range, and a large level range;

the partial ranges of each of the alignment control variables include a medium small level range and a medium large level range;

a second mountain road drive mode where the vehicle runs on a mountain road a winding degree of which is relatively small is inferred as the road/traffic condition when the vehicle speed falls within the medium large level range, the lateral acceleration falls within the large level range, the steering angle falls within the medium level range, and the steering angular speed falls within the medium small level range;

a control output, corresponding to the first or second control output, is retrieved based on at least one control rule corresponding to the inferred second mountain road drive mode; and that target value of the alignment control variable associate with the caster angle which falls within the medium large level range, and those target values of the alignment control variable respectively associated with the camber and toe angles which fall individually within the medium small level ranges are determined based on the retrieved control output.

18. The wheel alignment control method according to claim 8, wherein:

the plurality of parameters include vehicle speed, lateral acceleration, longitudinal acceleration, steering angle, and steering angular speed;

the partial ranges associated with each of the plurality of parameters include a small level range, a medium small level range, and a large level range;

the partial ranges of each of the alignment control variables include a medium small level range and a large level range;

a thruway drive mode where the vehicle runs on a thruway is inferred as the road/traffic condition when the vehicle speed falls within the large level range, the lateral acceleration falls within the medium small level range, and the longitudinal acceleration, the steering angle and the steering angular speed fall individually within the small level ranges;

a control output, corresponding to the first or second control output, is retrieved based on at least one control rule corresponding to the inferred thruway drive mode; and that target value of the alignment control variable associated with the caster angle which falls within the large level range and those target values of the alignment control variables respectively associated with the camber and toe angles which fall individually within the small level ranges are determined based on the retrieved control output.

19. The wheel alignment control method according to claim 8, wherein:

the plurality of parameters include second steering history, vehicle speed, and steering angle;

the partial ranges associated with each of the plurality of parameters include a small level range and a medium level range;

the partial ranges of the alignment control variable associated with the caster angle include a large level range;

a high-speed steering-hold mode where the vehicle turns at a high speed, with the steering angle kept maintained, is inferred as the road/traffic condition when the second steering history falls within the small level range and the vehicle speed and the steering angle fall individually within the medium level ranges;

a control output, corresponding to the first or second control output, is retrieved based on at least one control rule corresponding to the inferred high-speed steering-hold mode; and that target value of the alignment control variable associated with the caster angle which falls within the large level range is determined based on the retrieved control output.

20. The wheel alignment control method according to claim 8, wherein:

the plurality of parameters include first steering history;

the partial ranges associated with the first steering history include a large level range;

the partial ranges of each of the alignment control variables include a small level range and a large level range;

a first steering mode where a driver feels a high degree of fatigue during steering operation is inferred as the degree of driver fatigue when the first steering history falls within the large level range;

a control output, corresponding to the first or second control output, is retrieved based on at least one control rule corresponding to the inferred first steering mode; and that target value of the alignment control variable associated with the caster angle which falls within the small level range is determined based on the retrieved control output.

21. The wheel alignment control method according to claim 8, wherein:

the plurality of parameters include first steering history;

the partial ranges associated with the first steering history include a medium level range;

the partial ranges of each of the alignment control variables include a medium level range;

a second steering mode where a driver feels a medium degree of fatigue during steering operation is inferred as the degree of driver fatigue when the first steering history falls within the medium level range;

a control output, corresponding to the first or second control output, is retrieved based on at least one control rule corresponding to the inferred second steering mode; and that target value of the alignment control variable respectively associated with the caster, camber and toe angles which fall individually within the medium level ranges are determined based on the retrieved control output.

22. The wheel alignment control method according to claim 8, wherein:

the plurality of parameters include first steering history;

the partial ranges associated with the first steering history include a small level range;

the partial ranges of each of the alignment control variables include a small level range and a large level range;

a third steering mode where a driver feels a low degree of fatigue during steering operation is inferred as the degree of driver fatigue when the first steering history falls within the small level range;

a control output, corresponding to the first or second control output, is retrieved based on at least one control rule corresponding to the inferred third steering mode; and that target value of the alignment control variable associated with the caster angle which falls within the small level range and those targets value of the alignment control variables respectively associated with the camber and toe angles which fall individually within the large level ranges are determined based on the retrieved control output.

23. The wheel alignment control method according to claim 8, wherein:

the plurality of parameters include second steering history;

the partial ranges associated with the second steering history include a large level range;

the partial ranges of each of the alignment control variables include a small level range and a large level range;

a fourth steering mode where a driver feels a high degree of steering difficulty during steering operation is inferred as the perceived steering difficulty when the second steering history falls within the large level range;

a control output, corresponding to the first or second control output, is retrieved based on at least one control rule corresponding to the inferred fourth steering mode; and that target value of the alignment control variable associated with the caster angle which falls within the small level range and those targets value of the alignment control variables respectively associated with the camber and toe angles which fall individually within the large level ranges are determined based on the retrieved control output.

24. The wheel alignment control method according to claim 8, wherein:

the plurality of parameters include second steering history;

the partial ranges associated with the second steering history include a medium level range;

the partial ranges of each of the alignment control variables include a medium level range;

a fifth steering mode where a driver feels a medium degree of steering difficulty during steering operation is inferred as the perceived steering difficulty when the second steering history falls within the medium level range;

a control output, corresponding to the first or second control output, is retrieved based on at least one control rule corresponding to the inferred fifth steering mode; and those targets value of the alignment control variables respectively associated with the caster, camber and toe angles which fall individually within the medium level ranges are determined based on the retrieved control output.

25. The wheel alignment control method according to claim 8, wherein:

the plurality of parameters include second steering history;

the partial ranges associated with the second steering history include a small level range;

the partial ranges of each of the alignment control variables include a small level range and a large level range;

a sixth steering mode where a driver feels a low degree of steering difficulty during steering operation is inferred as the perceived steering difficulty when the second steering history falls within the small level range;

a control output, corresponding to the first or second control output, is retrieved based on at least one control rule corresponding to the inferred sixth steering mode; and that target value of the alignment control variable associated with the caster angle which falls within the large level range and those targets value of the alignment control variables respectively associated with the camber and toe angles which fall individually within the small level ranges are determined based on the retrieved control output.

26. A wheel alignment control apparatus for a vehicle, comprising:

actuators respectively provided in suspensions of the vehicle for changing a well alignment of the vehicle;

drive means for driving said actuators;

sensor means for detecting values of a plurality of parameters indicative of a behavior of the vehicle; and a controller for setting target values of wheel alignment control variables, and for supplying a control signal to said drive means such that the wheel alignment is in conformity with the target values;

wherein said controller estimates a road/traffic condition in which the vehicle runs on the basis of an interrelationship among the detected values of the plurality of parameters, retrieves a first control output in accordance with at least one control rule corresponding to the estimated road/traffic condition, and determines the target values of the wheel alignment control variables respectively associated with a camber angle, caster angle, and toe angle of wheels of the vehicle on the basis of the retrieved first control output.

27. A wheel alignment control apparatus for a vehicle, comprising:

actuators respectively provided in suspensions of the vehicle for changing a well alignment of the vehicle;

drive means for driving said actuators;

sensor means for detecting values of a plurality of parameters indicative of a behavior of the vehicle; and a controller for setting target values of wheel alignment control variables, and for supplying a control signal to said drive means such that the wheel alignment is in conformity with the target values;

wherein said controller estimates at least one of a degree of driver fatigue and of a degree of driver perceived difficulty in respect of steering on the basis of an interrelationship among the detected values of the plurality of parameters, retrieves a second control output in accordance with at least one control rule corresponding to the estimated at least one of a degree of driver fatigue and of a degree of driver perceived difficulty, and determines the target values of the wheel alignment control variables respectively associated with a camber angle, caster angle, and toe angle of wheels of the vehicle on the basis of the retrieved second control output.

28. A wheel alignment control apparatus for a vehicle, comprising:

actuators respectively provided in suspensions of the vehicle for changing a wheel alignment of the vehicle;

drive means for driving said actuators;

sensor means for detecting values of a plurality of parameters indicative of a behavior of the vehicle; and a controller for setting target values of wheel alignment control variables, and for supplying a control signal to said drive means such that the wheel alignment is in conformity with the target values;

wherein said controller estimates a road/traffic condition in which the vehicle runs on the basis of an interrelationship among the detected values of the plurality of parameters, retrieves a first control output in accordance with at least one control rule corresponding to the estimated road/traffic condition, estimates at least one of a degree of driver fatigue and of a degree of driver perceived difficulty in respect of steering on the basis of an interrelationship among the detected values of the plurality of parameters, retrieves a second control output in accordance with at least one control rule corresponding to the estimated at least one of a degree of driver fatigue and of a degree of driver perceived difficulty, and determines the target values of the wheel alignment control variables respectively associated with a camber angle, caster angle, and toe angle of wheels of the vehicle on the basis of the retrieved first and second control outputs.

* * * * *